US012265553B2

(12) United States Patent
Li et al.

(10) Patent No.: US 12,265,553 B2
(45) Date of Patent: Apr. 1, 2025

(54) AI-AUGMENTED COMPOSABLE AND CONFIGURABLE MICROSERVICES FOR RECORD LINKAGE AND RECONCILIATION

(71) Applicant: PwC Product Sales LLC, New York, NY (US)

(72) Inventors: Chung-Sheng Li, Scarsdale, NY (US); Winnie Cheng, West New York, NJ (US); Mark John Flavell, Madison, NJ (US); Nicholas John Hamer, Tampa, FL (US); Rhodri Davies, Tampa, FL (US); Thomas Vincent Giacomucci, Malvern, PA (US); Lacey A. Woolf, Springfield, VA (US); Raymund Anthony Florand Beltran, Wesley Chapel, FL (US); Craig Sharples, West Lafayette, IN (US); Matthew F. Connelly, Hingham, MA (US); Kevin Ma Leong, Newark, NJ (US); Scott Likens, Austin, TX (US); Joseph David Voyles, Louisville, KY (US); Xiaoying Chen, Shanghai (CN); Waqar Sarguroh, Chicago, IL (US); Nancy Alayne Lizotte, Saline, MI (US)

(73) Assignee: PwC Product Sales LLC, New York, NY (US)

( * ) Notice: Subject to any disclaimer, the term of this patent is extended or adjusted under 35 U.S.C. 154(b) by 0 days.

(21) Appl. No.: 18/192,421

(22) Filed: Mar. 29, 2023

(65) Prior Publication Data

US 2024/0330323 A1 Oct. 3, 2024

(51) Int. Cl.
*G06F 7/00* (2006.01)
*G06F 16/28* (2019.01)

(52) U.S. Cl.
CPC .................. *G06F 16/285* (2019.01)

(58) Field of Classification Search
CPC ...... G06F 16/285; G06F 16/901; G06F 16/41; G06F 16/335; G06F 16/24578;
(Continued)

(56) References Cited

U.S. PATENT DOCUMENTS

2005/0138079 A1\* 6/2005 Liu .................. G06F 16/353
2010/0306199 A1\* 12/2010 Andrea ................ G06F 16/284
707/740

(Continued)

OTHER PUBLICATIONS

International Search Report and Written Opinion mailed Sep. 11, 2023, directed to International Application No. PCT/US2023/016731; 11 pages.

*Primary Examiner* — Mohammad A Sana
(74) *Attorney, Agent, or Firm* — Morrison & Foerster LLP

(57) ABSTRACT

Provided herein are methods and systems for identifying a related data values in a plurality of datasets. The method can include extracting data from the plurality of datasets, identifying potential linking categories, and determining a validity of the potential linking categories. One or more linking categories can be selected from the potential linking categories based on the validity, and related data values can be identified between the plurality of datasets based on the selected linking categories. Also provided herein are methods and systems for classifying data values as reconciled or non-reconciled. The method can include identifying a plurality of related data values in a plurality of datasets. For each of the plurality of related data values, a similarity score and confidence score can be determined, and the plurality of related data values can be classified as reconciled or non-reconciled based on the similarity score and/or the confidence score.

22 Claims, 12 Drawing Sheets

(58) Field of Classification Search
CPC ...... G06F 16/9535; G06F 16/93; G06F 16/22; G06F 16/2228; G06F 40/51; G06F 40/295; G06F 40/117; G06Q 40/12
See application file for complete search history.

(56) References Cited

U.S. PATENT DOCUMENTS

| | | | |
|---|---|---|---|
| 2015/0154306 A1* | 6/2015 | Lightner | G06F 16/901 |
| | | | 707/728 |
| 2019/0205318 A1* | 7/2019 | Tripathi | G06F 16/24578 |
| 2020/0380212 A1 | 12/2020 | Butler | |
| 2020/0410000 A1 | 12/2020 | Chen | |
| 2021/0263900 A1 | 8/2021 | Joyce et al. | |
| 2022/0358293 A1* | 11/2022 | Renard | G06F 16/353 |
| 2023/0004590 A1 | 1/2023 | Li et al. | |
| 2023/0004604 A1 | 1/2023 | Li et al. | |
| 2023/0004845 A1 | 1/2023 | Li et al. | |
| 2023/0004888 A1 | 1/2023 | Li et al. | |
| 2023/0005075 A1 | 1/2023 | Li et al. | |
| 2024/0203598 A1* | 6/2024 | Neumann | G16B 40/00 |

* cited by examiner

200
Identify related data values between plurality of datasets
202
Classify the related data values as reconciled or non-reconciled
204
Determine a roll forward amount based on the reconciled data values
206
FIG. 2

400

```
┌─────────────────────────────────────────────────────────────┐
│  Determine a data structure of a dataset based on the       │
│  corresponding data values of the dataset                   │
│  402                                                        │
└─────────────────────────────────────────────────────────────┘
                              │
                              ▼
┌─────────────────────────────────────────────────────────────┐
│  Determine a content of each of the data categories of the  │
│  dataset based on the data values in the respective data    │
│  category                                                   │
│  404                                                        │
└─────────────────────────────────────────────────────────────┘
                              │
                              ▼
┌─────────────────────────────────────────────────────────────┐
│  Identify one or more relationships between the data        │
│  categories of the dataset based on the data structure of   │
│  the dataset and/or content of the categories of the dataset│
│  406                                                        │
└─────────────────────────────────────────────────────────────┘
```

Extract data categories and corresponding data values from a dataset
502

↓

Identify one or more potential linking categories from the extracted data categories
504

↓

Determine a validity of the potential linking categories based on the corresponding data values of the potential linking categories
506

↓

Select one or more linking categories from the potential linking categories based on the validity of the selected one or more linking categories
508

↓

Identify related data values between the plurality of datasets based on the selected one or more linking categories
510

| ID | Value |
|---|---|
| (1,1) | 25 |
| (2,1) | 40 |
| (3,1) | 75 |

902

| ID | Value |
|---|---|
| (1,1.1) | 26 |
| (1.9,1) | 31 |
| (3.9,1) | 40 |

903

| ID | Value | Similarity | Confidence | Status |
|---|---|---|---|---|
| (1,1) | 25 | 95% | 100% | Reconciled |
| (2,1) | 40 | 55% | 100% | Not Reconciled |
| (3,1) | 75 | 0% | 64% | Not Reconciled |

FIG. 9

AI-AUGMENTED COMPOSABLE AND CONFIGURABLE MICROSERVICES FOR RECORD LINKAGE AND RECONCILIATION

FIELD

The present invention relates to systems and methods for AI-augmented data processing, and more specifically, to data processing systems and methods applying composable and configurable microservices for record linkage and reconciliation.

BACKGROUND

Data integration is a critical processing operation that is used in a wide range of applications including handling medical records, generating a universal census, data warehousing, and automated auditing. One aspect of data integration is record linkage (also known as data linkage), which is the task of finding records in datasets that refer to the same entity. An entity is a unique object such as a thing, person, place, unit, or item, and a dataset can contain information about an entity in various categories (also called attributes) that each contain data values (also called features). In a relational database where data is stored in a table, the rows of the table correspond to the entities, and the columns of the table correspond to the attributes. For example, a dataset may contain information regarding several people (entities), where the information includes data categories, such as name and address, containing data values specific to each person. Record linkage approaches that attempt to integrate datasets may be able to generate one-to-one linkage between particular records, but lack the ability to designate one-to-many, many-to-one, and many-to-many linkages. Moreover, existing record linkage methods often lack configurability to integrate data from varied datasets, such as from datasets containing a combination of reports, tables from relational databases or enterprise resource planning (ERP) reports, document collections, books, databases, websites, etc.

In addition to record linkage, another foundational data integration process is reconciliation (also known as tie-out), which is the process of ensuring that two sets of records are in agreement. In an accounting context, reconciliation involves ensuring that the money leaving an account matches the actual money spent, which can be accomplished by verifying that all balances from the two sets of records match at the end of a particular accounting period. Reconciliation can identify accounting errors, such as a typographical error in an amount or missing transaction data, and may identify fraudulent practices. Thus, it is important to perform reconciliation on a regular and ongoing basis to ensure the accuracy of financial records and to identify and rectify fraud expeditiously. While reconciliation can be performed manually, that is a time-intensive process that may not keep pace with the need to regularly perform reconciliation and may be prone to introducing human errors. Automated processes may overcome these issues; however, existing automated processes are generally rigid in that they are hardwired to specific data sources (usually a subledger account) and produce only a binary output: reconciled or not reconciled.

SUMMARY

As explained above, record linkage involves identifying records related to the same entity from various data sources among datasets. One approach that can be used to integrate data is deterministic record linkage. Deterministic record linkage involves generating links between data records based on the number of individual data values that match. A data record includes all information in a dataset corresponding to a particular entity. In a relational database, information corresponding to a particular entity is stored in a row, with the data values of that row categorized by attribute (such as "Name," "Date of Birth," etc.). In the most stringent application of deterministic record linkage, a record corresponding to a given entity in a first dataset is said to be "linked" to a record in a second dataset when the two records agree, character for character, on all identifiers. In other words, strict deterministic record linkage requires that every data value of every data category of two datasets be an exact match. Another less stringent application of deterministic record linkage classifies two records as linked when enough identifiers above a certain threshold match, such as at least 90% of the data values match. Deterministic record linkage is suitable when the datasets share a common identifier to describe an entity. For instance, when both datasets identify a particular person (entity) based on their social security number (identifier). Alternatively, deterministic record linkage may also be suitable when datasets share several representative identifiers that identify the entity when used in combination. For instance, a person may be identified based on their name and date of birth when used in combination.

When the datasets lack a common identifier, deterministic record linkage generally ignores the fact that certain identifiers have more discriminatory power than others. That is, deterministic record linkage in the absence of a common identifier generally presumes that the identifiers used to assess linkage (often called linkage variables), should be weighed equally. Alternatively, probabilistic record linkage strategies can be implemented, which assesses the discriminatory power of different individual identifiers and the likelihood that two records are a match based on whether they agree or disagree on multiple identifiers. Probabilistic record linkage (also known as fuzzy matching) involves determining a weight for one or more data categories based on each category's estimated ability to correctly identify a match. The weights of the data categories can be used to calculate the probability of whether two data values from two datasets correspond to the same entity, with all pairs having a probability above a certain threshold designated as linked.

Deterministic record linkage methods are computationally efficient when assessing large datasets, provided the datasets share a common identifier and do not contain many missing values or errors. Without a common identifier, probabilistic record linkage can link datasets even with missing values or errors but becomes computationally inefficient when integrating large datasets. Neither deterministic nor probabilistic record linkage is well-suited to integrating datasets with varied data sources without extensive pre-processing and normalization. Moreover, known deterministic and probabilistic record linkage methodologies can provide a one-to-one linkage but lack the ability to generate links between records that are one-to-many, many-to-one, and many-to-many.

In addition, as explained above, known techniques for reconciliation include rigid processes that are tailored specifically to the data sources containing data to be reconciled. These existing methodologies thus lack configurability in that they lack the ability to efficiently reconcile datasets with varied data sources. Moreover, these reconciliation methods are strictly applied and produce only a binary output by classifying individual data values as either reconciled or non-reconciled.

Accordingly, there exists a need for improved record linkage methodologies and improved reconciliation methodologies to address one or more of the above-identified shortcomings of known systems for automated data processing. In particular, there is a need for a record linkage methodology that can efficiently identify linked records in datasets containing data from a variety of data sources and that can provide more robust linkage information. There is a similar need for improved reconciliation methods that implement configurability to reconcile varied datasets and provide improved reconciliation classifications of individual data values. Furthermore, according to known methodologies, record linkage and reconciliation are performed independently as separate processes pursuant to an automated data processing operation. Thus, there exists a need for an integrated platform that implements both record linkage and reconciliation of varied datasets.

Described herein are methods and systems for an integrated platform that implements AI-augmented composable and configurable microservices for record linkage and reconciliation. In particular, the methods and systems described herein can perform automated or semi-automated data processes for a data integration process. Record linkage between multiple data sources can be decomposed into multiple pairwise record linkage operations, and can identify linkages that are one-to-one, one-to-many, many-to-one, and many-to-many, thereby providing robust linkage information. Reconciliation of individual data values that have been linked can provide classifications of data values as reconciled or non-reconciled as well as a confidence score associated with that classification, thereby providing improved reconciliation classifications compared to existing methods. The record linkage and reconciliation methods are provided herein within a composable framework that can be adapted as necessary to process records from a variety of data sources and can be implemented simultaneously to quickly process data as necessary for a data integration operation.

In one or more examples, a method for identifying a plurality of related data values in a plurality of datasets, wherein the method is performed by a system comprising one or more processors, can comprise: extracting a plurality of data categories and corresponding data values from a dataset of the plurality of datasets, identifying one or more potential linking categories from the plurality of extracted data categories, determining a validity of the one or more potential linking categories based on the corresponding data values of the one or more potential linking categories, selecting one or more linking categories from the potential linking categories based on the validity of the selected one or more linking categories, and identifying related data values between the plurality of datasets based on the selected one or more linking categories.

Identifying the one or more potential linking categories may comprise: generating a data profile for a respective dataset of the plurality of datasets comprising the respective potential linking category, and generating a uniqueness hypothesis for each of the respective potential linking categories based on the data profile of the respective dataset. Determining the validity of the one or more potential linking categories can be based on the data profile of the respective dataset and historical data from past sessions of identifying related data values within other datasets.

Generating the data profile can comprise: determining a data structure of the respective dataset based on the corresponding data values of the respective dataset, determining a content of each category of the one or more categories of the respective dataset based on the corresponding data values of the respective category, and identifying one or more relationships between the one or more data categories of the respective dataset based on the data structure and/or the content of the one or more data categories of the respective dataset.

Determining the content of each category of the one or more categories may comprise, for a category of the one or more data categories: generating statistics about the corresponding data values of the category, identifying one or more errors in the corresponding data values of the category, and identifying one or more empty data cells having missing corresponding data values.

Generating statistics can comprise determining a sum of the corresponding data values of the category, identifying a minimum and a maximum data value, determining an average data value, and/or determining a length of each data value of the corresponding data values of the category. Determining the content of each category of the one or more categories may comprise identifying a taxonomy of each category. Identifying the plurality of related data values can comprise applying a rule-based approach and/or a machine learning (ML)-based approach.

Each of the plurality of related data values of a first dataset may have one corresponding data value in a second dataset. The one or more of the plurality of related data values of a first dataset may have more than one corresponding data value in a second dataset. A plurality of the related data values of a first dataset can correspond to a plurality of the corresponding data values of a second dataset. A plurality of the related data values of a first dataset may correspond to one corresponding data value in a second dataset.

The plurality of datasets may store data in one of a table, a report, a spreadsheet, a document, and a collection of documents. The plurality of datasets may store data according to a self-describing data format. The plurality of datasets may not share a common identifier.

The method may comprise: determining, for each of the plurality of related data values of a first dataset of the plurality of datasets: a similarity score that indicates a degree of similarity between a respective data value of the plurality of related data values of the first dataset and a corresponding related data value of a second dataset comprising a plurality of corresponding related data values, a confidence score that indicates a confidence level as to whether the similarity score is accurate, and classifying the plurality of related data values of the first dataset as reconciled or non-reconciled based on the similarity score.

The plurality of related data values classified as reconciled may have a similarity score above a first predetermined threshold and a confidence score above a second predetermined threshold. Determining the similarity score may comprise assigning a similarity score of zero if the respective data value of the plurality of related data values of the first dataset differs from the corresponding related data value of the second dataset by more than a predetermined amount. Determining the similarity score can be based in part on a distance between the respective data value of the plurality of data values of the first dataset and the corresponding data value of the second dataset. Determining the confidence score can comprise determining a cosine similarity between each of the plurality of data values of the first dataset and the corresponding related data values of the second dataset.

In one or more examples, a system for identifying a plurality of related data values in a plurality of datasets can comprise one or more processors configured to cause the system to: extract a plurality of data categories and corresponding data values from a dataset of the plurality of datasets, identify one or more data categories from the plurality of extracted data categories as one or more potential linking categories, determine a validity of the one or more potential linking categories based on the corresponding data values of the one or more potential linking categories, select one or more linking categories of the potential linking categories based on the validity of the selected one or more linking categories, and identify related data values between the plurality of datasets based on the selected one or more linking categories.

In one or more examples, a non-transitory computer-readable storage medium can store instructions for identifying a plurality of related data values in a plurality of datasets, the instructions configured to be executed by a system comprising one or more processors to cause the system to: extract a plurality of data categories and corresponding data values from a dataset of the plurality of datasets, identify one or more data categories from the plurality of extracted data categories as one or more potential linking categories, determine a validity of the one or more potential linking categories based on the corresponding data values of the one or more potential linking categories, select one or more linking categories of the potential linking categories based on the validity of the selected one or more linking categories, and identify related data values between the plurality of datasets based on the selected one or more linking categories.

In one or more examples, a method for classifying data values as reconciled or non-reconciled, wherein the method is performed by a system comprising one or more processors, can comprise: identifying a plurality of related data values in a plurality of datasets, determining, for each of the plurality of related data values of a first dataset of the plurality of datasets: a similarity score that indicates a degree of similarity between a respective data value of the plurality of related data values of the first dataset and a corresponding related data value of a second dataset comprising a plurality of corresponding related data values, a confidence score that indicates a confidence level as to whether the similarity score is accurate, and classifying the plurality of related data values of the first dataset as reconciled or non-reconciled based on the similarity score and/or the confidence score.

The plurality of related data values classified as reconciled may have a similarity score above a first predetermined threshold and a confidence score above a second predetermined threshold. Determining the similarity score can comprise assigning a similarity score of zero if the respective data value of the plurality of related data values of the first dataset differs from the corresponding related data value of the second dataset by more than a predetermined amount.

Determining the similarity score may be based in part on a distance between the respective data value of the plurality of data values of the first dataset and the corresponding data value of the second dataset. Determining the confidence score may comprise determining a cosine similarity between each of the plurality of data values of the first dataset and the corresponding related data values of the second dataset.

Identifying the plurality of related data values can comprise: extracting a plurality of data categories and corresponding data values from a dataset of the plurality of datasets, identifying one or more potential linking categories from the plurality of extracted data categories, determining a validity of the one or more potential linking categories based on the corresponding data values of the one or more potential linking categories, selecting one or more linking categories from the potential linking categories based on the validity of the selected one or more linking categories, and identifying related data values between the plurality of datasets based on the selected one or more linking categories.

Identifying the one or more potential linking categories may comprise: generating a data profile for a respective dataset of the plurality of datasets comprising the respective potential linking category, and generating a uniqueness hypothesis for each of the respective potential linking categories based on the data profile of the respective dataset. Determining the validity of the one or more potential linking categories may be based on the data profile of the respective dataset and historical data from past sessions of identifying related data values within other datasets.

Generating the data profile can comprise: determining a data structure of the respective dataset based on the corresponding data values of the respective dataset, determining a content of each category of the one or more categories of the respective dataset based on the corresponding data values of the respective category, and identifying one or more relationships between the one or more data categories of the respective dataset based on the data structure and/or the content of the one or more data categories of the respective dataset.

Determining the content of each category of the one or more categories may comprise, for a category of the one or more data categories: generating statistics about the corresponding data values of the category; identifying one or more errors in the corresponding data values of the category, and identifying one or more empty data cells having missing corresponding data values.

Generating statistics can comprise determining a sum of the corresponding data values of the category, identifying a minimum and a maximum data value, determining an average data value, and/or determining a length of each data value of the corresponding data values of the category. Determining the content of each category of the one or more categories can comprise identifying a taxonomy of each category. Identifying the plurality of related data values can comprise applying a rule-based approach and/or a machine learning (ML)-based approach.

Each of the plurality of related data values of the first dataset may have one corresponding data value in the second dataset. One or more of the plurality of related data values of the first dataset may have more than one corresponding data value in the second dataset. A plurality of the related data values of the first dataset may correspond to a plurality of the corresponding data values of the second dataset. A plurality of the related data values of the first dataset may correspond to one corresponding data value in the second dataset.

The plurality of datasets can store data in one of a table, a report, a spreadsheet, a document, and a collection of documents. The plurality of datasets store may data according to a self-describing data format. The plurality of datasets may not share a common identifier.

In one or more examples, a system for classifying data values as reconciled or non-reconciled, can comprise one or more processors configured to cause the system to: identify a plurality of related data values in a plurality of datasets, determine, for each of the plurality of related data values of a first dataset of the plurality of datasets: a similarity score that indicates a degree of similarity between a respective data value of the plurality of related data values of the first dataset and a corresponding related data value of a second dataset comprising a plurality of corresponding related data values, a confidence score that indicates a confidence level as to whether the similarity score is accurate, and classify the plurality of related data values of the first dataset as reconciled or non-reconciled based on the similarity score.

In one or more examples, a non-transitory computer-readable storage medium can store instructions for classifying data values as reconciled or non-reconciled, the instructions configured to be executed by a system comprising one or more processors to cause the system to: identify a plurality of related data values in a plurality of datasets, determine, for each of the plurality of related data values of a first dataset of the plurality of datasets: a similarity score that indicates a degree of similarity between a respective data value of the plurality of related data values of the first dataset and a corresponding related data value of a second dataset comprising a plurality of corresponding related data values, a confidence score that indicates a confidence level as to whether the similarity score is accurate, and classify the plurality of related data values of the first dataset as reconciled or non-reconciled based on the similarity score.

Additional advantages will be readily apparent to those skilled in the art from the following detailed description. The aspects and descriptions herein are to be regarded as illustrative in nature and not restrictive. It will be appreciated that any of the variations, aspects, features, and options described in view of the systems apply equally to the methods and vice versa. It will also be clear that any one or more of the above variations, aspects, features, and options can be combined.

All publications, including patent documents, scientific articles and databases, referred to in this application are incorporated by reference in their entirety for all purposes to the same extent as if each individual publication were individually incorporated by reference. If a definition set forth herein is contrary to or otherwise inconsistent with a definition set forth in the patents, applications, published applications and other publications that are herein incorporated by reference, the definition set forth herein prevails over the definition that is incorporated herein by reference.

BRIEF DESCRIPTION OF THE FIGURES

Various embodiments are described with reference to the accompanying figures, in which:

FIG. 2 shows an exemplary method for performing aspects of a data processing operation, according to one or more examples of the disclosure;

FIG. 4 shows an exemplary method for identifying related data values in a plurality of datasets, according to one or more examples of the disclosure;

FIG. 5 shows an example of record linkage that utilizes one data category, according to one or more examples of the disclosure;

FIG. 9 shows an example of reconciliation, according to one or more examples of the disclosure;

DETAILED DESCRIPTION

Figure 1:
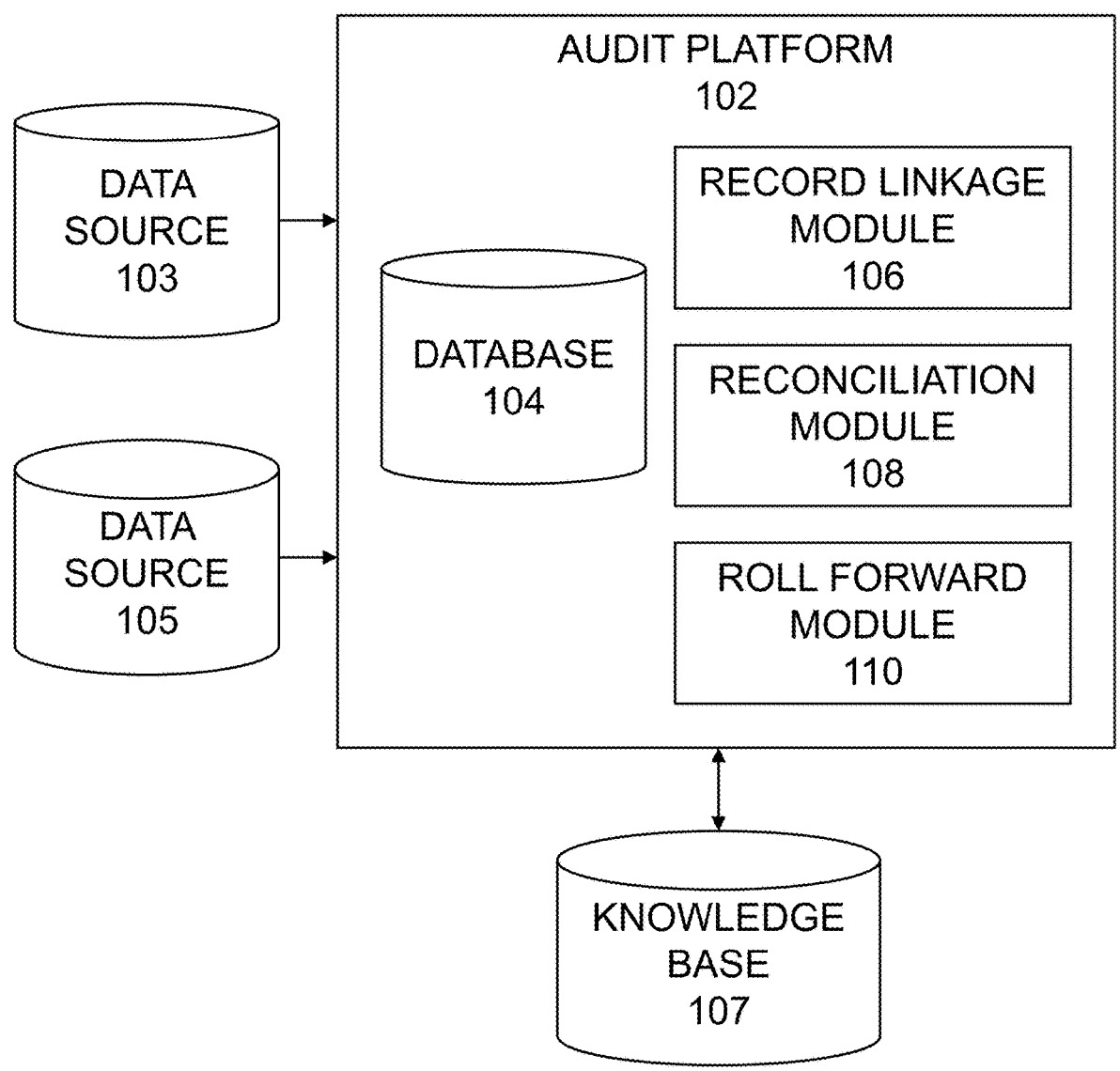
FIG. 1 shows a functional block diagram of an exemplary data processing platform, according to one or more examples of the disclosure.

Described herein are methods and systems for an integrated platform that implements AI-augmented composable and configurable microservices for record linkage and reconciliation. In particular, the methods and systems described herein can perform automated or semi-automated data processes for a data processing operation. Record linkage between multiple data sources can be decomposed into multiple pairwise record linkage operations, and can identify linkages that are one-to-one, one-to-many, many-to-one, and many-to-many, thereby providing robust linkage information. Reconciliation of individual data values that have been linked can provide classifications of data values as reconciled or non-reconciled as well as a confidence score associated with that classification, thereby providing improved reconciliation classifications compared to existing methods.

Furthermore, described herein are systems and methods for an integrated platform that implements AI-augmented composable and configurable microservices to determine a roll forward amount. A roll forward amount can be determined using data values that are reconciled or not fully reconciled and provide robust information relating to confidence metrics of the roll forward amount (or based on multiple roll forward amounts). The record linkage, reconciliation, and roll forward methods are provided herein within a composable framework that can be adapted as necessary to process records from a variety of data sources and can be implemented simultaneously to quickly process data as necessary for a data processing operation.

In one or more examples, the record linkage methodologies described herein can identify related data values between a plurality of datasets (e.g., data values related to a common entity). An exemplary method for identifying related data values can begin with extracting data values from a dataset and/or normalizing data via one or more data processing operations. The method may involve performing entity resolution of data categories of a respective dataset, which can involve comparing the data categories of a dataset against known data categories from a knowledge substrate or may involve comparing data categories of a first dataset against data categories of a second dataset to identify common data categories. The method may involve generating a data profile for the dataset, which can include determining a structure and content of the dataset as well as identifying relationships between data values of the dataset. The data profile can be used to generate one or more uniqueness hypotheses for the respective data categories of the dataset, which correspond to the uniqueness of a given category as it pertains to whether the category is a good candidate to serve as a linking variable to integrate a pair of datasets (e.g., to perform record linkage). The uniqueness hypotheses can be validated against historical information and/or information of the data profile to select certain data categories as linking categories. The data values of a first dataset can then be linked to corresponding related data values of a second dataset using the selected linking categories to integrate the first and second dataset. Once being integrated, a pair (or more) of datasets can be referred to as "linked" or "cross-linked." The output of a record linkage methodology described herein can include a combined dataset that comprises each of the cross-linked datasets, or a new dataset that identifies related data values in their respective datasets. This output may be one-to-one, one-to-many, many-to-one, or many-to-many, providing improved record linkage capabilities and robust linkage information.

In one or more examples, the reconciliation methodologies described herein can classify data values as reconciled or non-reconciled, along with a confidence score associated with a confidence level that the reconciliation classification is accurate. Reconciliation may be performed using cross-linked datasets that are the output of a record linkage operation. After determining a similarity score and confidence score for each pair of related data values, the individual data values can be classified as reconciled or non-reconciled based on the similarity score and/or confidence score. The output of a reconciliation methodology described herein can include the reconciliation status, (e.g., classification of reconciled or non-reconciled) similarity score, and confidence score for each data value, and may be stored in a database for further data processing. The output data may also include metadata indicating the data, criteria, and/or data sources upon which the reconciliation classification and/or confidence score was rendered.

In one or more examples, the roll forward methodologies described herein can determine a roll forward amount. The method may be applicable in a generalized manner to analyze multiple datasets from a multitude of datasets and include the ability to distinguish between particular data values that have been reconciled, and those that have not. The method can include identifying a starting balance and determining an aggregate value of "additions" or "credits" to the account for a period and an aggregate value of the "subtractions" or "debits" from the account for the period in order to determine the roll forward amount. The data values that are aggregated to determine the credits and debits for the accounting period can include reconciled data values along with their confidence score as determined according to a reconciliation methodology as described herein. Accordingly, the roll forward methodology described herein can determine a roll forward amount that is based on more than only data values that are fully reconciled (e.g., data values with 100% confidence). The roll forward methodology may determine a multi-faceted roll forward amount with various sub-amounts each corresponding to the confidence level of the particular data values that were included in the determination. For instance, the roll forward amount may have a first value with a 100% confidence score and a second value with a 90% confidence score, based on credit and debit amounts with 100% confidence scores and 90% confidence scores, respectively. In one or more examples, the roll forward amount may be determined based on one pair of datasets, one credit dataset and one debit dataset. The roll forward amount may be referred to as "composable" in that any number of credit datasets and any number of debit datasets may be analyzed without requiring data processing that is specifically formulated for the datasets being analyzed. For instance, the roll forward amount may be based on a pair of credit datasets and a pair of debit datasets, possibly that were received from different data sources. Optionally, the value of the roll forward amount may be compared against an aggregate value of the data values not included in the roll forward amount from the datasets. For example, the roll forward amount (including sub-amounts) may be based on only 65% of the data values in the datasets, and thus 35% of the data values were not reconciled and thus not considered. If the ratio is below a predetermined threshold, indicating that a large portion of the datasets include non-reconciled data values, then the system executing the roll forward method may trigger one or more functionalities, such as retrieving additional data, or reporting the output and soliciting manual review by a human user.

In the following description of the various examples, reference is made to the accompanying drawings, in which are shown, by way of illustration, specific examples that can be practiced. The description is presented to enable one of ordinary skill in the art to make and use the invention and is provided in the context of a patent application and its requirements. Various modifications to the described examples will be readily apparent to those persons skilled in the art and the generic principles herein may be applied to other examples. Thus, the present invention is not intended to be limited to the examples shown but is to be accorded the widest scope consistent with the principles and features described herein.

FIG. 1 shows a functional block diagram of an exemplary data processing platform 102, according to one or more examples of the disclosure. The data processing platform 102 can implement an automated or semi-automated audit process. The data processing platform 102 receives information from a plurality of independent data sources, 103, 105. It should be noted that two data sources 103 and 105 are used for explanatory purposes only, and the data processing platform 102 can receive information from any number of data sources. Each of the data sources 103 and 105 can store a variety of data such as documents, financial statements, evidence, etc. One or more of the data sources 103 and 105 can comprise any one or more computer storage devices such as databases, data stores, data repositories, live data feeds, or the like. In one or more examples, the data processing platform 102 may receive information from one or more of the data sources 103 and 105 on a scheduled basis, in response to a user input, in response to one or more trigger conditions being met, and/or in response to data being manually transmitted.

Data received from the data sources 103 and 105 can be provided in any suitable electronic data format. The data received from the data sources 103 and 105 may include structured, unstructured, and/or partially structured (e.g., semi-structured) data. In one or more examples, the data received from the data sources 103 and 105 may be stored in a local database 104 of the data processing platform 102. The data received from the data sources 103 and 105 may be transmitted in and/or converted to a self-describing data format. For example, the data may follow a comma-separated value (CSV) format that stores each record in a line of the file with one or more fields separated by commas, with line breaks delineating records. The data received from the data sources 103 and 105 may include data representing one or more of general ledger information, invoice information, accounts receivable information, cash receipts information, inventory information, purchase order documents, bill of lading documents, bank statement documents, data representing customer information and/or product information, etc.

The data processing platform 102 can include several modules for implementing aspects of an audit process using the information received from the data sources 103 and 105. For example, the data processing platform 102 can include a record linkage module 106, a reconciliation module 108, and a roll forward module 110. Each of the record linkage module 106, the reconciliation module 108, and the roll forward module 110 may include one or more processors (including one or more of the same processors as one another) configured to perform any one or more of the techniques disclosed herein. The modules may be communicatively coupled with one another and/or with the data processing platform 102. The data processing platform 102 may act as an orchestration engine and be configured to coordinate cooperative functionalities between the record linkage module 106, the reconciliation module 108, and/or the roll forward module 110. For example, the data processing platform 102 may coordinate the exchange of data between said modules and/or control the way an output generated by one of said modules may trigger and/or implement a functionality of another module. In one or more examples, any one of the record linkage module 106, the reconciliation module 108, the roll forward module 110, and/or the data processing platform 102 may receive user inputs to control functionalities described herein.

The record linkage module 106 can be a software routine of the data processing platform 102 that implements a record linkage operation of datasets received from one or more of the data sources 103 and 105. The reconciliation module 108 can be a software routine of the data processing platform 102 that implements a reconciliation process to reconcile data values of datasets received from one or more of the data sources 103 and 105. The roll forward module 110 can be a software routine of the data processing platform 102 that implements a roll forward process to determine a roll forward amount based on data values of one or more datasets received from one or more of the data sources 103 and 105. Thus, the data processing platform 102 may perform the functionalities described by each of the record linkage module 106, the reconciliation module 108, and the roll forward module 110 as part of a single processing function or single software module. The data processing platform 102 may implement such functionalities using a smaller number of module (e.g., less than three) or a larger number of modules (e.g., more than three).

Output data generated by the data processing platform 102, and/or by any of the record linkage module 106, the reconciliation module 108 and the roll forward module 110 may include electronic data in any suitable format. The output data may indicate whether criteria were met (e.g., a binary output), an extent to which criteria were met (e.g., a score), a confidence level (e.g., a confidence score) associated with one or more determinations, and/or metadata indicating the data, criteria, and/or data source upon which one or more assessments was rendered. Output data generated by the data processing platform 102, and/or by any of the record linkage module 106, the reconciliation module 108 and the roll forward module 110, may be stored in the local database 104, or in any other suitable computer storage component of the data processing platform 102 and/or an associated system. Output data generated by the record linkage module 106, the reconciliation module 108, the roll forward module 110, and/or the data processing platform 102 may be transmitted, presented to a user, used to generate one or more visualizations, and/or used to trigger one or more automated system actions.

In one or more examples, functionality of the reconciliation module 108 may be triggered by output data generated by the record linkage module 106. Similarly, functionality of the roll forward module 110 may be triggered by output data generated by the record linkage module 106 and/or the reconciliation module 108. Cooperative functionality between the record linkage module 106, the reconciliation module 108, and the roll forward module 110 may be controlled and coordinated by the data processing platform 102. In one or more examples, data processing performed by the data processing platform 102 or any of the record linkage module 106, the reconciliation module 108, and/or the roll forward module 110 may identify one or more anomalies in the output data generated, which may trigger a functionality to transmit output data and/or to display output data to a human user, such as in the form of an alert soliciting manual review.

The data processing platform 102 can also be communicatively coupled to one or more knowledge bases 107. The knowledge base 107 can act as a data repository that stores a variety of information such as historical data from past record linkage operations and/or information curated by a financial professional to assist in performing certain data processing operations. Any data processing operation referenced herein may include application of one or more models trained by machine-learning. Accordingly, the knowledge base 107 may store training data related to record linkage, reconciliation, and/or roll forward operations, etc. The data processing platform 102 may receive data from the knowledge base 107 on a scheduled basis, in response to a user input, in response to one or more trigger conditions being met, and/or in response to the data being manually sent. Data received from the knowledge base 107 may be provided in any suitable data format. Interaction with the knowledge base 107 may be query based. For example, interaction with the knowledge base 107 may be question answering, information retrieval, query into a knowledge graph engine and/or inferencing engine (e.g., against inferencing rules). Output data generated by the data processing platform 102 may be considered "context aware" because the data processing platform 102 is able to draw on contextual information that is received from the knowledge base 107 when performing data processing functionalities.

The data processing platform 102 may provide one or more user-facing options such that a user can configure the platform and customize the data processing performed by the platform for particular use-cases. For example, a user may select from available data sources 103 and 105, select particular data formats or datasets from the data sources 103, 105, and/or the local database 104, and may configure the way data processing is performed. A user may specify a particular sensitivity setting, for example specifying that any data processing that results with a confidence score must be above a predetermined threshold such as 90% and may specify actions the data processing platform 102 should implement if data processing results with a confidence score below the predetermined threshold. A user may select, for example, that when data processing falls below the predetermined threshold, additional data should be requested from the data sources 103 and 105, and/or extracted from the local database 104. Optionally, the user may specify that when data processing below the predetermined threshold the data processing platform 102 should query the knowledge base 107 and assess historical information regarding past sessions with such results. A user may specify at what threshold an alert should be communicated to a human to solicit manual review. The user may also specify what data is processed, and/or what percentage of data from each data source 103 and 105 should be processed in a given operation.

FIG. 2 shows an exemplary method 200 for performing aspects of a data processing operation, according to one or more examples of the disclosure. The method 200 may be performed by a data processing platform, such as the data processing platform 102 of FIG. 1. The data processing operations performed via method 200 may be defined by a user, defined by system settings, defined by a third-party input, and/or dynamically determined by the system. Output data generated via method 200 can be provided to an expert along with intelligent feedback regarding the data processing conducted via each step of the method 200. For instance, the output data generated via method 200 may include metadata indicating the data, criteria, and/or data sources subject to data processing. In one or more examples, a system implementing method 200 may perform one or more automated system actions that are triggered based on the output data.

In one or more examples, the method 200 can begin with block 202, wherein related data values between a plurality of datasets are identified. As noted above, identifying data values related to a common entity in separate datasets is referred to as record linkage. Accordingly, block 202 can correspond to an implementation of a record linkage methodology. In one or more examples, as part of block 202, the system executing method 200 may receive a plurality of datasets to be integrated and extract data regarding a particular entity from the plurality of datasets, for example by applying one or more document understanding techniques. The system may identify data related to a particular entity among a plurality of entities represented in the received data. Optionally, a particular entity may be specified by a user input received by the system. The system may apply one or more data analysis operations to automatically identify related data values (e.g., data values related to one another by virtue of being related to a common entity). Upon identifying related data values between a plurality of datasets at block 202, the datasets can be referred to as "linked" or "cross-linked." The output of the data processing implemented at block 202 can include a combined dataset that combines the linked datasets, and/or a dataset that identifies any related data values in one or all of the plurality of datasets analyzed.

After identifying related data values between datasets at block 202, the method 200 can proceed to block 204, wherein the related data values are classified as reconciled or non-reconciled. Classifying data values as reconciled or non-reconciled can be referred to as the process of reconciling data values and/or datasets. A system executing method 200 may apply one or more data analysis operations to automatically reconcile the data of linked datasets. The output of the data processing implemented at block 204 can include output data that identifies non-reconciled data values and reconciled data values (e.g., data values that have been found to agree among the plurality of datasets) along with a confidence score associated with a level of confidence that the reconciliation determination is accurate. The output data may also include metadata indicating the data, criteria, and/or data sources upon which the reconciliation classification and/or confidence score was rendered.

Optionally, the method 200 can include block 206, wherein a roll forward amount is determined based on the reconciled data values classified at block 204. Method 200 may include block 206 when the datasets analyzed at block 202 contain financial information. A roll forward amount for a new accounting period is determined based on "rolling forward" accounting data of the previous period to establish a baseline for the new accounting period. A system executing method 200 may apply one or more data analysis operations to automatically determine a roll forward amount. The output of block 206 can include a roll forward amount along with a confidence score corresponding to a confidence level that the roll forward amount is accurate. The output may include several roll forward amounts, each with a distinct confidence score. For instance, a first amount with a confidence score of 100%, a second amount with a confidence score of 95%, and a third amount with a confidence score of 90%. The confidence score of the roll forward amount can be based on the confidence score computed at block 204 and thus may consider the confidence associated with the reconciliation status of the data values included in the roll forward determination.

Figure 3:
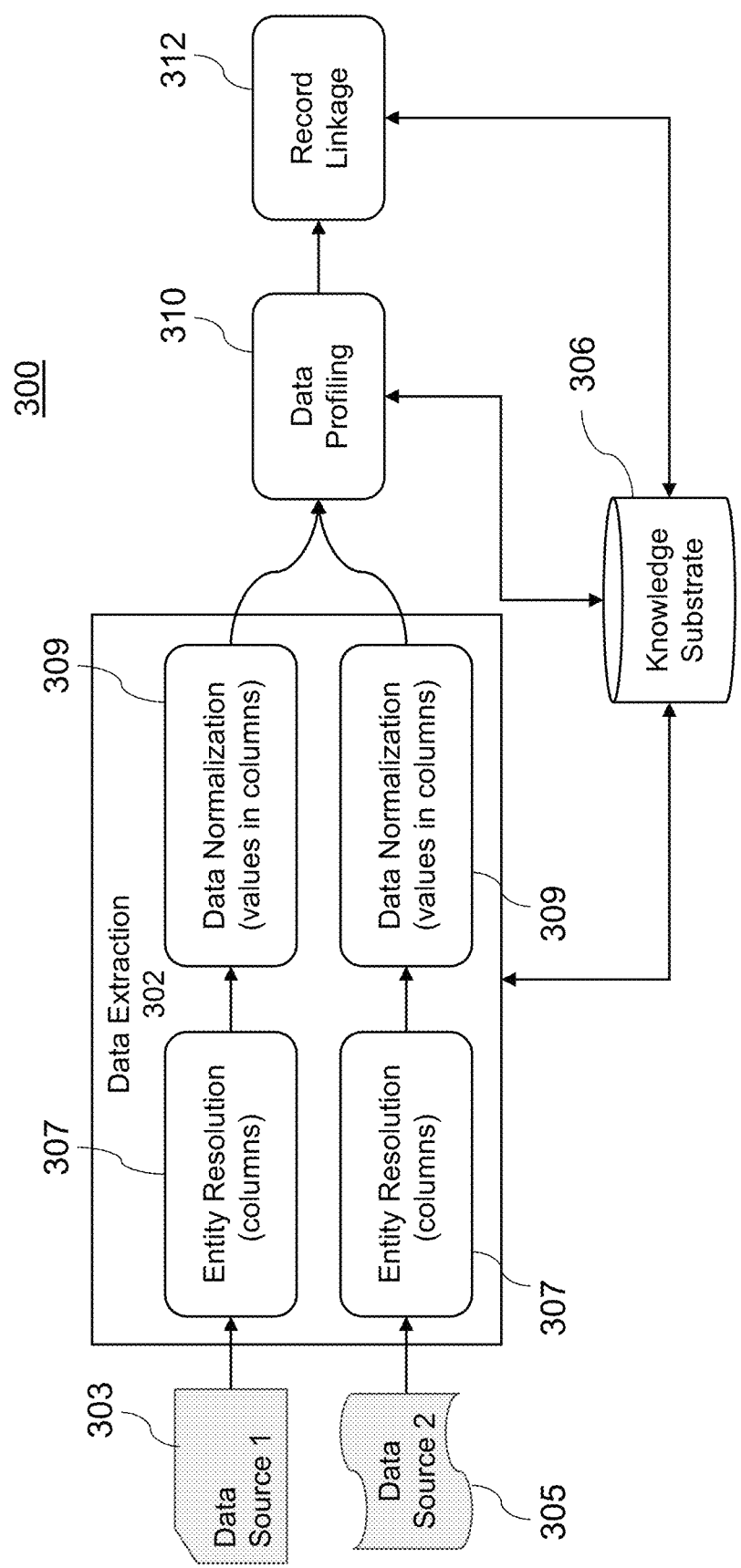
FIG. 3 shows a functional block diagram of an exemplary record linkage module, according to one or more examples of the disclosure.

An initial step of a data processing operation can include record linkage, which essentially involves identifying data values that are related to each other in separate datasets by virtue of being related to a common entity. FIG. 3 shows a functional block diagram of an exemplary record linkage module, according to one or more examples of the disclosure. The record linkage module 300 may be implemented as a software module of a data processing platform, such as via record linkage module 106 of data processing platform 102 of FIG. 1. The record linkage module 300 may include a data extraction engine 302, a data profiling engine 310, and a record linkage engine 312. Optionally, data processing performed by each of the data extraction engine 302, data profiling engine 310, and record linkage engine 312 may be performed by a single engine.

In one or more examples, the record linkage module 300 may include a knowledge substrate 306 which may include any one or more data sources such as a master data source, an ontology data source, and an exogenous knowledge data source. The data sources included in the knowledge substrate 306 may be provided as part of a single computer system, multiple computer systems, a single network, or multiple networks. The data sources included in the knowledge substrate 306 may be configured to provide data to the data extraction engine 302 and/or directly to one or both of the data profiling engine 310 and the record linkage engine 312. The knowledge substrate 306 may include ontology/taxonomy data, exogenous data, knowledge graph/knowledge base data, and/or inferencing rules data. Ontology data may include, for example, IncoTerms data for international commercial terms that define the cost, liability, and/or insurance among the sell side, buy side, and shipper for shipping a product. Exogenous data may include, for example, external knowledge relating to a specific audit client, such as related to the industry of the client, the geographic area of the client, and/or the entire economy.

Components of the record linkage module 300 may receive data from the knowledge substrate 306 on a scheduled basis, in response to a user input, in response to one or more trigger conditions being met, and/or in response to the data being manually sent. Data received from the knowledge substrate 306 may be provided in any suitable data format. Interaction with the knowledge substrate 306 may be query based. For example, interaction with the knowledge substrate 306 may be question answering, information retrieval, query into a knowledge graph engine and/or inferencing engine (e.g., against inferencing rules). Output data generated by one or more of the data extraction engine 302, the data profiling engine 310, and the record linkage engine 312 may be considered "context aware" because the respective engines are able to draw on contextual information that is received from the knowledge substrate 306 when performing data processing functionalities.

The record linkage module 300 can receive data from a first data source 303 and a second data source 305 that is then processed via the data extraction engine 302. It should be understood that the data extraction engine 302 may receive data from any number of data sources and is not limited to receiving data from only a first data source 303 and second data source 305. Upon receiving data, the data extraction engine 302 may perform data processing operations in order to extract and/or normalize input data to generate output data. The one or more data processing operations may include document preprocessing operations, character recognition operations, information extraction operations, and/or natural language understanding models. In one or more examples, the one or more data operations applied by the data extraction engine 302 may be defined by a user, defined by system settings, defined by a third-party input, and/or dynamically determined by the record linkage module 300.

The data extraction engine 302 may generate output data representing information extracted from the documents received from the first data source 303 and the second data source 305 and said output data may be transmitted to the data profiling engine 310 for further processing as described below. The data extraction engine 302 may apply one or more deep learning-based text detection and recognition operations. Said operations may include a flexible optical character recognition (OCR) operation, which may generate data representing characters recognized in documents received from the first data source 303 and the second data source 305.

The data extraction engine 302 may extract one or more columns from input data received from each of the first data source 303 and the second data source 305 and then process said input data using an entity resolution engine 307 and a data normalization engine 309. The entity resolution engine may process input data from one or both of the first data source 303 and the second data source 305 as compared to data from the knowledge substrate 306. For instance, the entity resolution engine may compare the columns of input data from the first data source 303 against columns of data in a dataset of the knowledge substrate 306 to determine whether the column of data from the first data source 303 corresponds to a particular known data category (e.g., to perform entity resolution of the data category of the column).

The entity resolution engine 307 may process data to determine whether the columns of input data from the first data source 303 reference the same entity (e.g., same real-world thing) as the columns of input data from the second data source 305. That is, whether a column of data from the first data source 303 corresponds to the same category of information as a column of data from the second data source 305. For example, the entity resolution engine 307 may determine that the input data from the first data source 303 comprises columns corresponding to "Name" and "Address" and that the input data from the second data source 305 also contains a column corresponding to "Name." Accordingly, the entity resolution engine 307 can compare the columns of the input data from each of the first data source 303 and the second data source 305 and determine that both include a data category for "Name." The entity resolution engine 307 may perform contextualization data processing to determine the context of an entity that is extracted. The context of an entity may include a master customer database that can be used to identify a particular customer, a master product database that can be used to identify a particular product, IncoTerms ontology that can be used to identify particular shipping terms, etc.

The data normalization engine 309 may process data values within the columns to perform one or more normalization data processing operations. A normalization data processing operation may normalize a data value so that it can be used for subsequent comparison or classification. Examples include (but are not limited to) the following: detection and removal of duplicate data values, normalization of customer name data (such as alias, abbreviations, and potentially including parent/sibling/subsidiary when the name is used in the context of payment) based on master customer/vendor data; normalization of address data (e.g., based on geocoding, based on a standardized address from a postal office, and/or based on customer/vendor data); normalization of numerical values according to a standard schema; normalization of product name and SKU based on master product data; normalization of shipping and payment terms based on common terminology (e.g., based on Inco-Terms); and/or normalization of currency exchange code (e.g., based on ISO 4217).

Output data from the data extraction engine 302 can be transmitted to the data profiling engine 310. The data profiling engine 310 can generate a date profile for each dataset received from the first data source 303 and the second data source 305 that can be used to integrate the datasets via the record linkage engine 312. FIG. 4 shows an exemplary method 400 for generating a data profile for a dataset, according to one or more examples of the disclosure. The method 400 may be executed by the record linkage module 300 of FIG. 3, such as via the data profiling engine 310, and/or by a data processing platform 102, such as via record linkage module 106. The data processing operations performed via method 400 may be defined by a user, defined by system settings, defined by a third-party input, and/or dynamically determined by the system.

In one or more examples, method 400 can begin at block 402, wherein a data structure of a dataset is determined based on the corresponding data values of the dataset. A dataset may include data values of a number of attributes (e.g., categories) corresponding to an entity. For instance, a dataset may include data categories corresponding to the "Name," "Address," "Credit Card Number," for a plurality of people (entities). Determining the data structure of a dataset can be an important step to understand how the data of the dataset is structured (e.g., identifying data categories) and to provide information that can be used to ensure data consistency. For example, determining the data structure of a dataset can identify attributes across the datasets that are classified under a different data category but have the same or similar semantics (i.e., the same or similar content). Determining the structure of a dataset can involve generating statistics about the corresponding data values of data categories the dataset. For example, determining the structure of the dataset can include performing mathematical checks on data values of the dataset, such as determining a sum, maximum, minimum, average, etc., and outputting data regarding such mathematical checks. Determining the structure of the dataset can involve flagging any empty cells of the dataset and determining the number of empty cells (corresponding to missing values) for each respective data category of the dataset. Determining the structure of the dataset may involve identifying one or more errors in the corresponding data values of the category. For example, a dataset may include a category corresponding to a phone number for each entity. Determining the data structure of this dataset may involve determining the percentage of phone numbers that do not have the correct number of digits.

Determining the data structure of the dataset at block 402 of method 400 can include determining a data type and then processing the data based on the data type. For instance, a data type can be a date, an integer, a float, a character, a blob, etc. Numerical data values may be 1 treated differently than non-numerical (e.g., string) data values. A numerical data value may be assessed based on mathematical statistics such as the minimum value or earliest date, etc. A non-numerical data value may be assessed based on string length, or may assessed during block 404 based on taxonomy, such as based on information received from a knowledge substrate such as knowledge substrate 306 of FIG. 3.

After determining the data structure of the dataset at block 402, the method can proceed to block 404 wherein a content of each of the data categories of the dataset is determined based on the data values of each of the respective data categories of the dataset. Determining the data content of a dataset can include assessing individual data values to identify errors and/or classify data values. Determining the content of a dataset may be performed on an entity-by-entity basis. For example, a tabular dataset includes rows of data values each corresponding to an entity, with the rows separated into columns based on different data categories related to each entity. When determining the content of the dataset, method 400 may involve reviewing the dataset row-by-row. Determining the data content at block 404 can include identifying any rows of the dataset that contain problems or identifying any systemic issues occurring in the data. For instance, if the dataset contains the phone number for each entity, determining the content can include identifying a percentage of phone numbers that do not have an area code.

After determining the content of the data categories at block 404, the method 400 can proceed to block 406 wherein one or more relationships between the data categories are identified based on the data structure determined at block 402 and/or the content determined at block 404. Identifying relationships at block 406 involves identifying how parts of the dataset are related to one another. For example, a first dataset may include data categories of a "Credit Amount" and a "Debit Amount" and a second dataset may include a single data category that includes data values that are either positive (i.e., debit) or negative (i.e., credit). Identifying relationships at block 4-6 can include identifying that the "Credit Amount" category of the first dataset corresponds to the negative data values from the second dataset and that the "Debit Amount" category corresponds to the positive data values.

Returning now to FIG. 3, the output data from the data profiling engine 310 can be transmitted to the record linkage engine 312. The record linkage engine 312 can generate one or more uniqueness hypotheses based on the data profile generated by the data profiling engine 310. A uniqueness hypothesis may correspond to the relative uniqueness of individual categories (e.g., of individual "attributes") as it pertains to whether particular data categories are good candidates to serve as linking variables for integrating a pair of datasets (e.g., to perform record linkage). In other words, a uniqueness hypothesis can be a score that quantifies a prediction as to how well a particular data category will perform as a linking variable to link data values between different datasets. The uniqueness hypothesis may be a numerical value, such as a value between 0 and 1.

A particularly unique data category may be a suitable candidate to serve as a key linking variable, whereas a combination of data categories that are representative when used in combination may be suitable candidates to serve as linking variables simultaneously. For example, a dataset may contain data values corresponding to several purchase orders (entities). The data categories for each respective purchase order may include a purchase order number, a customer name, a date, and an amount. The purchase order number is particularly unique in that it can serve as a linking variable without other linking variables, and thus may be designated as a key linking variable. The combination of the data categories of customer name, date, and amount, may also be able to serve as linking variables when used in combination. A key linking variable as used herein may be referred to as a "primary identifier" whereas a combination of linking variables may be referred to collectively as a "secondary identifier." The record linkage engine 312 can generate a uniqueness hypothesis for each respective data category (or for at least one data category), which may be based on any one of and/or a combination of (1) the data structure of the dataset, (2) the data content of the dataset, and (3) the relationships identified in the dataset (e.g., based on the data profile of the dataset).

The uniqueness hypothesis for each of the one or more data categories can correspond to each respective data category's suitability to serve as a primary identifier and/or secondary identifier for record linkage. The record linkage engine 312 may designate particular data categories as "potential primary identifiers" or "potential secondary identifiers," which collectively may be classified as "potential linking categories." The record linkage engine 312 can validate the uniqueness hypotheses based on the data values of the potential linking categories. When validating the uniqueness hypotheses, the record linkage engine 312 may utilize information from the knowledge substrate 306. For example, hypothesis validation may be based on historical data from past record linkage sessions that corresponds to prior understanding of particular data category types that is received from the knowledge substrate 306. In particular, the knowledge substrate 306 may contain historical data that indicates the combination of customer name, order date, and order amount can be used in combination to link to a particular entry in a database containing information regarding order placement. This information can be used to determine a uniqueness hypothesis that includes the same or similar data categories of customer name, order date, and order amount is valid when linking to a database containing the same or similar data category as order placement.

Assessing the validity of the uniqueness hypotheses can be referred to as determining the validity of the potential linking categories, that is, determining the suitability of the potential linking categories to serve as linking variables. The output of this determination may be a single linking variable (e.g., a primary identifier), or a combination of linking variables (e.g., secondary identifiers), which may be referred to as "selected linking categories." The selected linking categories can be used to integrate the datasets. That is, the selected linking categories can be used to identify related data values between the datasets. Upon identifying related data values between datasets, the datasets can be referred to as "linked" or "cross-linked." The output of the record linkage engine 312 can include a combined dataset that combines the linked datasets, and/or a dataset that identifies any related data values in one or all of datasets analyzed.

FIG. 5 shows an exemplary method 500 for identifying related data values in a plurality of datasets, according to one or more examples of the disclosure. Method 500 refers to a process for record linkage, which may be performed by the record linkage module 300 of FIG. 3, and/or implemented as a software module of a data processing platform, such as via record linkage module 106 of data processing platform 102 of FIG. 1. The data processing operations performed via method 500 may be defined by a user, defined by system settings, defined by a third-party input, and/or dynamically determined by the system. Output data generated via method 500 can be provided to an expert along with intelligent feedback regarding the data processing conducted via each step of the method 500. For instance, the output data generated via method 500 may include metadata indicating the data, criteria, and/or data sources subject to data processing.

In one or more examples, method 500 begins at block 502, wherein data categories and corresponding data values are extracted from a dataset. The dataset may be one of a plurality of datasets from which the method 500 is extracting data categories and corresponding data values. The plurality of datasets may store data in one of a table, a report (such as an ERP report), a spreadsheet, a document, a collection of documents, etc. Accordingly, extracting data categories and corresponding data values from a dataset, may involve executing a document understanding algorithm in order to identify portions of a document (or a collection of documents) that should be extracted. The plurality of datasets may be received from one or more of a plurality of data sources in a self-describing format or may be converted to a self-describing data format at block 502. The plurality of datasets may not share a common identifier that is used to describe entities in the dataset. For instance, a first dataset may use a person's social security number as a unique identifier for each person, while a second dataset may rely on each person's date of birth. Where the data categories and data values are extracted from a pair of datasets comprising a table, the datasets may not share a trivial foreign key.

To extract data categories and data values at block 502, method 500 may apply one or more deep-learning based text detection and recognition operations, or rule-based recognition operations. When extracting data categories and data values at block 502, method 500 may involve performing one or more normalization data processing operations such that entity values may be used for subsequent comparison or classification.

Upon extracting data categories, entity resolution as it pertains to the data categories may be performed. That is, the extracted data categories from a dataset may be compared against exemplary data categories of a knowledge substrate or against extracted data categories of another dataset to determine what entity the extracted data categories relate to (e.g., a topic of the data category), or whether extracted categories relate to the same entity. Exemplary data categories may include, with reference to a bank transaction for example, a transaction reference number, a transaction date, a transaction amount, an invoice number, a payee identifier, etc.

After extracting data categories and data values at block 502, method 500 can proceed to block 504 wherein one or more data categories from the extracted data categories are identified as potential linking categories. Identifying a data category as a potential linking category is based on the data category's suitability to serve as a linking variable for record linkage (e.g., based on the uniqueness hypothesis corresponding to the data category). As discussed above, a data category may be suitable to serve as a primary identifier (based on uniqueness) or as a secondary identifier when used in combination with other data categories (based on uniqueness and relationships to the other data categories). At block 502, the method can generate output data (that is then processed at block 504) that includes a collection of uniqueness hypotheses for one or more of the data categories of the datasets corresponding to the data categories' suitability to serve as a primary identifier and/or secondary identifier for record linkage.

The uniqueness hypotheses generated at block 502 can be based on a data profile of the dataset containing the data categories being analyzed. That is, the uniqueness hypotheses generated at block 502 can be based on the structure and content of the dataset, and/or based on relationships between data values of the dataset. Accordingly, identifying the one or more potential linking categories at block 504 can involve generating a data profile for the dataset. Generating the data profile may be performed as described above with reference to method 400 of FIG. 4 and may involve determining the data structure of the dataset and the data content of the dataset and identifying the relationships between data categories of the dataset. When generating the data profile and/or generating uniqueness hypotheses, method 500 may execute a rule-based approach and/or a machine learning (ML)-based approach.

After identifying potential linking categories at block 504, method 500 can proceed to block 506 wherein the validity of the potential linking categories is determined. Determining the validity of the potential linking categories can include validating one or more uniqueness hypotheses. Validating a uniqueness hypothesis generally involves determining whether the hypothesis that a particular data category is a good candidate to serve as a linking variable is correct. Whereas generating the uniqueness hypothesis for a particular potential linking category may be based on the data profile of the dataset, validating the uniqueness hypothesis may be based on data from a knowledge substrate. For example, at block 506, the method 500 may compare historical data from past record linkage sessions to the data profile of the dataset, for instance by applying one or more ML-based processes, to assess the validity of the uniqueness hypothesis corresponding to the potential linking category.

When assessing validity at block 506, method 500 may designate potential linking categories as either valid or not valid. Where the validated uniqueness hypotheses of each of the potential linking categories is a value between 0 and 1, only potential linking categories with a uniqueness hypothesis above a certain threshold may be considered valid. For example, only potential linking categories with a uniqueness hypothesis above 0.5 may be considered "valid."

Valid potential linking categories may be classified based on their uniqueness hypothesis. For instance, where the uniqueness hypotheses are numerical values from 0 to 1, those data categories with uniqueness hypotheses close to 1 are considered more unique than those data categories with uniqueness hypotheses close to 0. Potential linking categories that are highly unique, that is, those with uniqueness hypotheses close to 1, may be designated as primary identifiers that can be used as linking variables without other data categories. A group of potential linking categories that are less unique may be designated as secondary identifiers to be used in combination.

After determining the validity of the potential linking categories at block 506, the method 500 can proceed to block 508 wherein one or more of the potential linking categories are selected ("selected linking categories") based on their respective validities. When selecting linking categories at block 506, method 500 may assess the uniqueness hypothesis of the potential linking categories and select only particular potential linking categories with a uniqueness hypothesis above a particular threshold value. In one or more examples, only data potential linking categories that were deemed "valid" at block 506 may be selected at block 508 as selected linking categories. In one or more examples, any potential linking categories designated as primary identifiers may be selected at block 508. In one or more examples, a collection of secondary identifiers may be selected at block 508. Optionally, the secondary identifiers will only be selected at block 508 if there were no primary identifiers designated at block 506. If no potential linking categories were deemed valid at block 506, the method 500 may activate a trigger to obtain information from a new dataset, or to provide an alert to solicit manual review by a human.

The linking categories that were selected at block 508 can be used at block 510, wherein related data values between the plurality of datasets are identified based on the selected linking categories. In particular, the selected linking categories can be used to integrate a plurality of datasets. Once being integrated, a pair (or more) of datasets can be referred to as "linked" or "cross-linked." The output of method 500 can include a combined dataset that comprises each of the cross-linked datasets, or a new dataset that identifies related data values in their respective datasets.

Upon completing method 500, the output may illustrate that each data value in a first dataset has one corresponding data value in a second dataset (e.g., a one-to-one record linkage). For example, a first dataset may contain one record corresponding to entity A and a second dataset may contain one record corresponding to entity A. The output may alternatively illustrate that one data value in a first dataset has more than one related data value in a second dataset (e.g., a one-to-many record linkage). In such scenario, the first dataset may contain one record corresponding to entity A, but the second dataset may contain a plurality of records corresponding to entity A. The output may illustrate that a plurality of data values in a first dataset have one corresponding data value in a second dataset (e.g., a many-to-one record linkage). In this example, the first dataset may contain a plurality of records corresponding to entity A, but the second dataset may contain only one record corresponding to entity A. The output may illustrate that a plurality of data values in a first dataset have a corresponding plurality of data values in a second dataset (e.g., many-to-many record linkage). In this case, both the first dataset and the second dataset may have a plurality of records corresponding to entity A. In one or more examples, upon identifying related data values at block 510, the system executing the method 500 may automatically trigger a functionality to transmit output data and/or to display output data to a human user.

Figure 6:
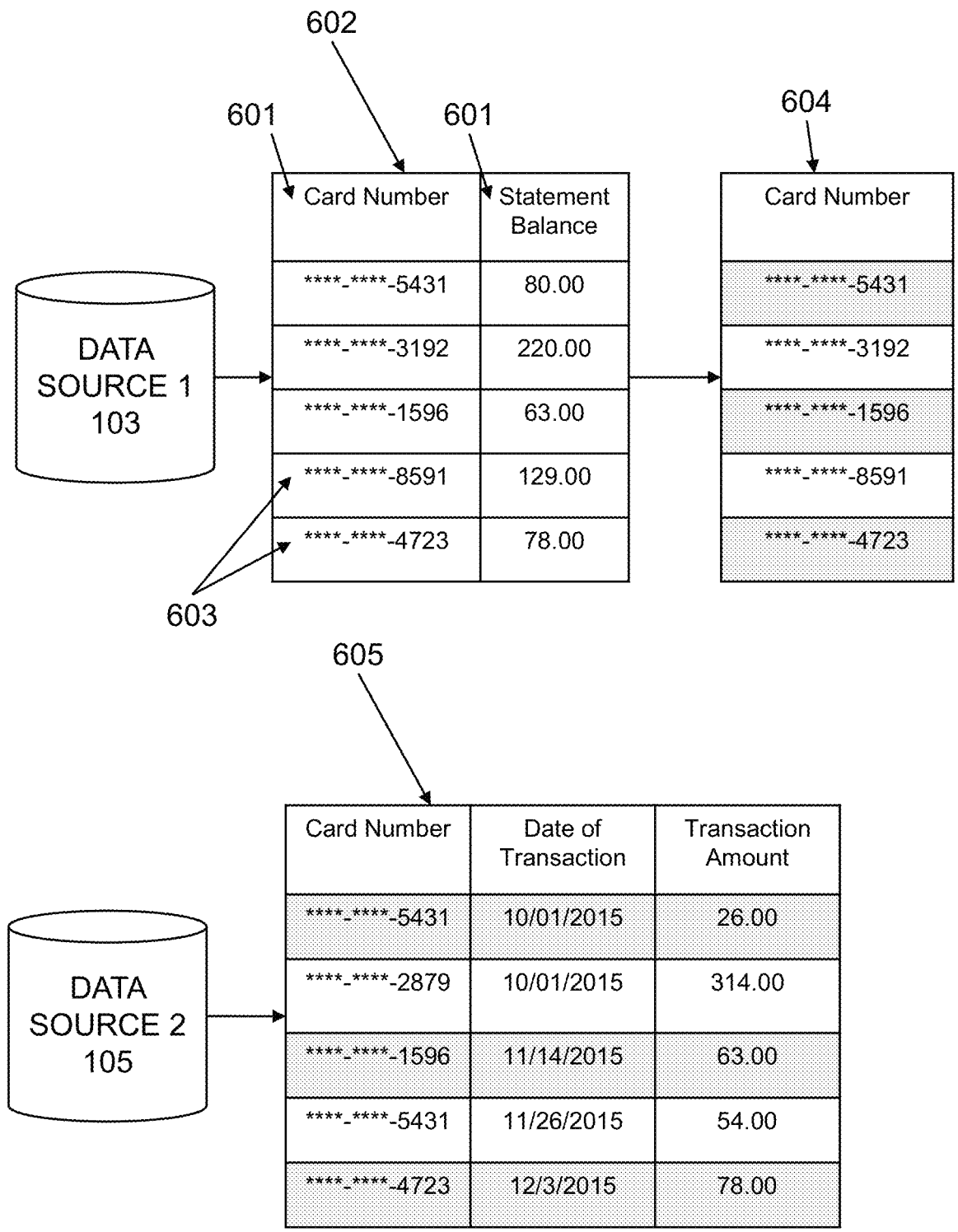
FIG. 6 shows an example of record linkage that utilizes a plurality of data categories, according to one or more examples of the disclosure.

FIG. 6 shows an example of record linkage that utilizes one data category, according to one or more examples of the disclosure. A collection of extracted data categories and data values is shown in table 602, which includes a pair of data categories 601, that each contain data values 603 for each entity (each row). The extracted data of table 602 is based on data received from a first data source 103. The selected linking category is shown in table 604, which includes one data category that can act as a primary identifier. As discussed above, to select particular data categories as potential linking categories, a data profile may be generated about the dataset of the first data source 103, which can be used to generate a uniqueness hypothesis for each data category 601. As shown here, the data categories of table 602 correspond to card number and statement balance. A uniqueness hypothesis for the card number data category may designate the category as suitable to be a primary identifier, that is, suitable to serve as a linking variable without the statement balance category. Assessing the validity of whether the card number category is a suitable linking variable (e.g., assessing validity of the hypothesis), may include comparing the card number category to previous record linkage operations that included such a category and/or comparing the card number category to the extracted data categories from the second data source 105, which are shown in table 605. Such assessment when compared to the extracted data categories shown in table 605 would reveal that table 605 has the same data category corresponding to card number. Accordingly, the card number data category may then be selected as the primary identifier and used to identify corresponding data values between the datasets of the first data source 103 and second data source 105 (e.g., to perform record linkage).

Figure 7:
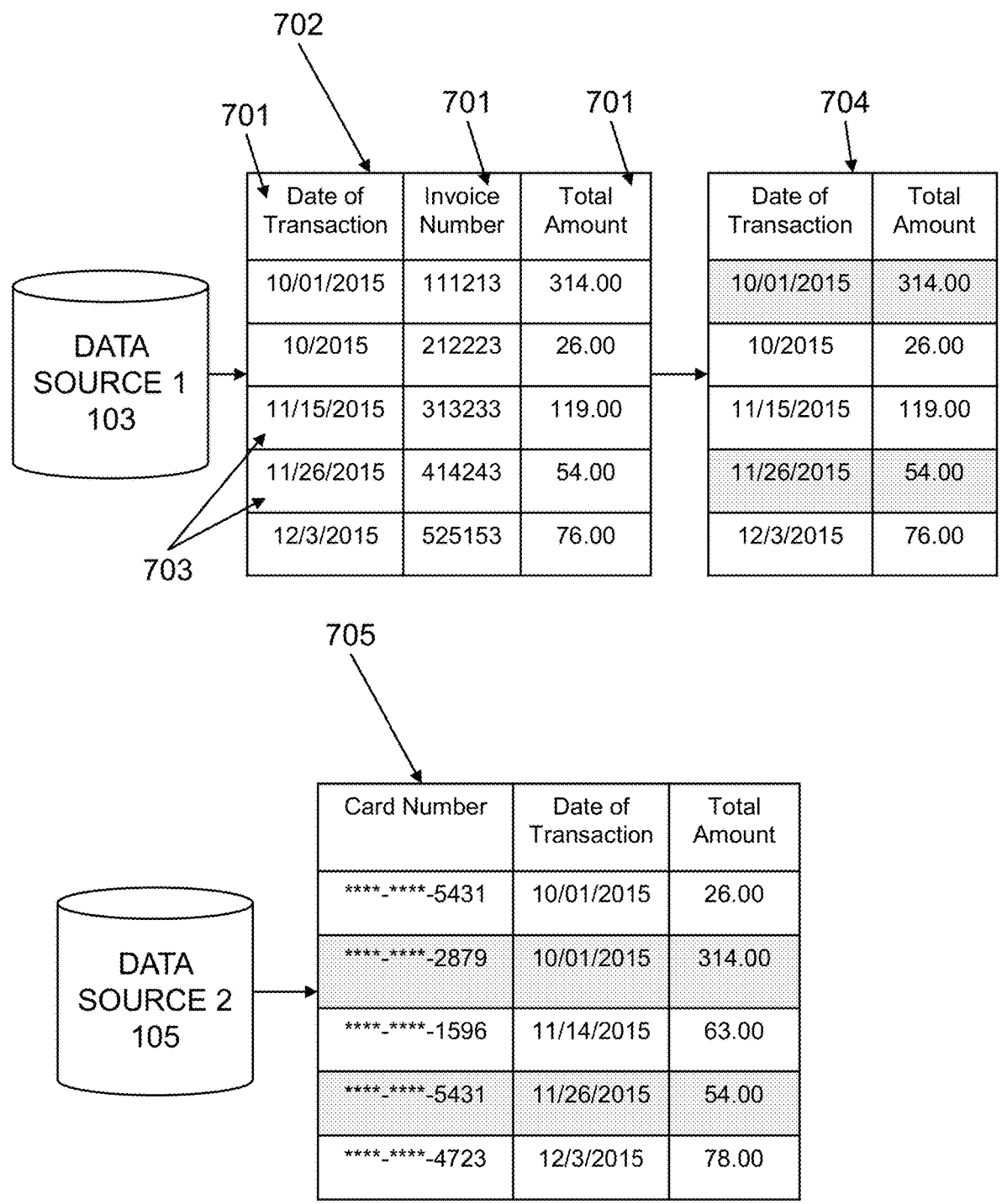
FIG. 7 shows an exemplary method for generating a data profile for a dataset, according to one or more examples of the disclosure.

FIG. 7 shows an example of record linkage that utilizes a plurality of data categories, according to one or more examples of the disclosure. A collection of extracted data categories and data values is shown in table 702, which includes three data categories 701 extracted from the first data source 103, each containing data values 703 corresponding to a particular entity. The selected linking categories are shown in table 704, which includes a pair of secondary identifiers. Here, validation of a uniqueness hypothesis for each data category 701 revealed that no individual data category 701 was suitable to serve as a primary identifier category, that is, no single data category was unique enough to identify related data values. This determination may have been based on a comparison of the data categories 701 of table 702 to a knowledge substrate including historical information that indicates a combination of the date of transaction and total amount categories may be suitable when used in combination. Such determination may alternatively have been made based on a comparison to extracted data categories in table 705 form the second data source 105. The selected data categories in 704 (e.g., the secondary identifiers) can then be used to integrate table 702 and table 705 to perform record linkage.

Figure 8:
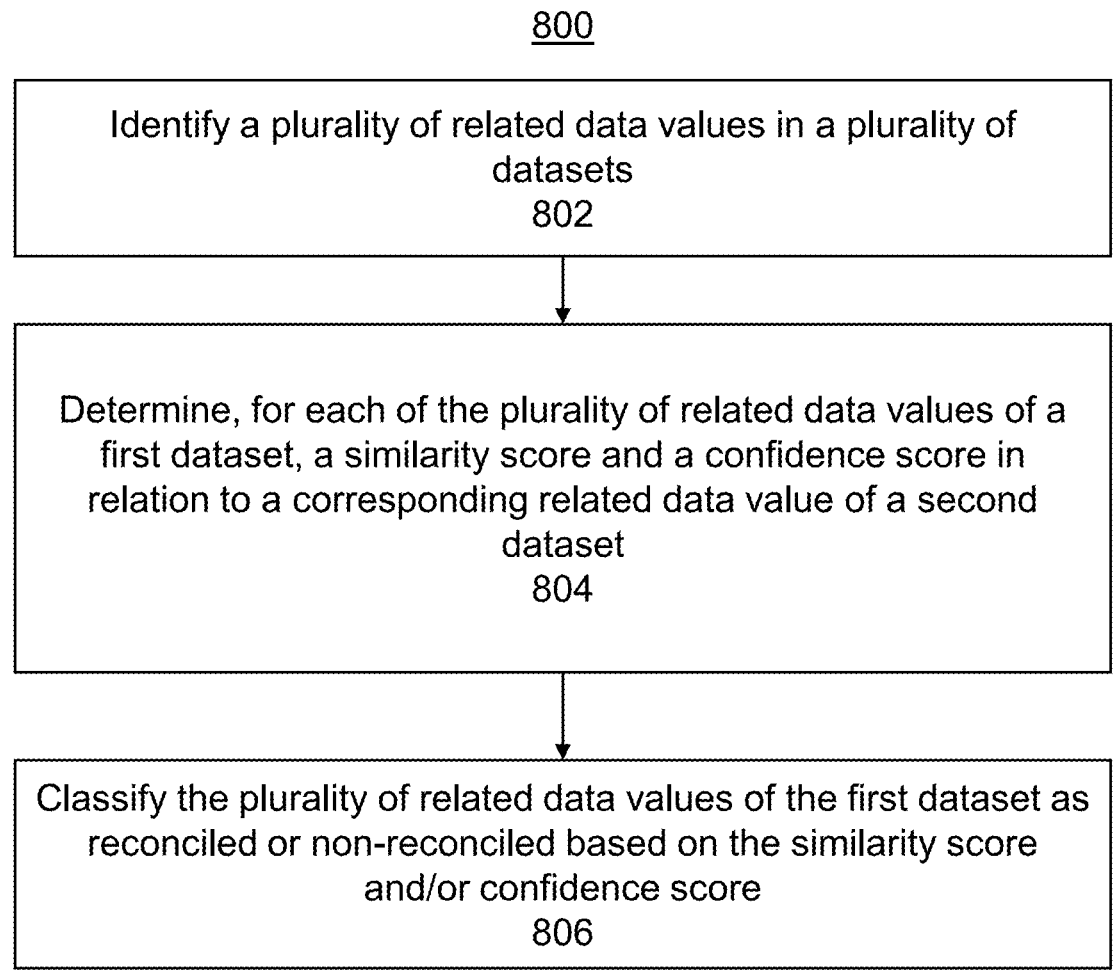
FIG. 8 shows an exemplary method for reconciling data values, according to one or more examples of the disclosure.

As discussed above with respect to method 200 of FIG. 2, the method 200 can include a first step at block 202 of identifying related data values between a plurality of datasets (e.g., performing record linkage), that is then followed by a reconciliation step at block 204. FIG. 8 shows an exemplary method 800 for reconciling data values, according to one or more examples of the disclosure. Method 800 may be executed when performing block 204 of method 200, and/or may be implemented as a software module of a data processing platform, such as via reconciliation module 108 of data processing platform 102 of FIG. 1. The data processing operations performed via method 800 may be defined by a user, defined by system settings, defined by a third-party input, and/or dynamically determined by the system. Output data generated via method 800 can be provided to an expert along with intelligent feedback regarding the data processing conducted via each step of the method 800. For instance, the output data generated via method 800 may include metadata indicating the data, criteria, and/or data sources subject to data processing.

In one or more examples, method 800 can begin at block 802 wherein a plurality of related data values are identified in a plurality of datasets. Block 802 can refer to the method discussed with reference to method 500 of FIG. 5, which may be performed by a record linkage engine as discussed with reference to FIG. 3 and include a method for generating a data profile as discussed with reference to FIG. 4. The output of block 802 can be a cross-linked dataset that combines a plurality of datasets into a single dataset, or that identifies related data values in their respective datasets.

At block 804, each of the plurality of related data values that were identified at block 802 may be assessed to determine a similarity score and a confidence score. In particular, related data values of a first dataset can be compared to the related data values of a second dataset to determine a similarity score that defines how similar a pair of related data values are, as well as a confidence score that corresponds to a level of confidence that the similarity score is accurate.

The similarity score may be calculated according to the following equation:

$$\text{Similarity} = \max\left\{1 - \frac{|a-b|}{\max_{\text{diff}}}, 0\right\} * 100 \quad \text{Eq. 1}$$

where $\max_{\text{diff}}$ is a parameter that can be set in advance to specify a sensitivity level of the calculation. For instance, it may be preferable than any values that differ from one another by more than 20 are automatically deemed not a match. Setting the $\max_{\text{diff}}$ as 20 in the above equation, would thus lead to the similarity score being 0 for any wo values that differ by more than 20 relative to one another. The similarity score may be determined based on the Euclidean distance between the two data values. The similarity score may be determined based on the Manhattan distance between each respective data value, which is a metric in which the distance between two points is the sum of the absolute differences of their Cartesian coordinates. That is, the Manhattan distances is the total sum of the difference between the x-coordinates and y-coordinates of two data values.

The confidence score may be a cosine similarity calculated according to the following equation:

$$\cos\theta = \frac{\vec{a} \cdot \vec{b}}{\|\vec{a}\|\|\vec{b}\|} = \frac{\sum_{i=1}^{n} a_i b_i}{\sqrt{\sum_{i=1}^{n} a_i^2} \sqrt{\sum_{i=1}^{n} b_i^2}} \quad \text{Eq. 2}$$

The cosine similarity may be advantageous because even if two vectors are far apart based on a Euclidean distance (for instance due to the size of a document or dataset), they may nonetheless be oriented closer together. The smaller the angle, the higher the cosine similarity. Weights used in the similarity score and/or the confidence score can be pre-scribed or trained using a machine-learning model, which may involve continuous learning based on the observed performance of the similarity score.

After determining the similarity score and confidence score for each pair of related data values at block 804, the method 800 can proceed to block 806 wherein the plurality of related data values are classified as reconciled or non-reconciled based on the similarity score and/or confidence score. According to deterministic reconciliation, classifying a particular data value as reconciled means that the data value has been found to "agree" based on the data value being present in another dataset. As used herein, the data values have a similarity score and confidence score, which provides richer information than a simple binary output that a data value is reconciled or non-reconciled. The output of the method 800 can thus include output data that identifies non-reconciled records and reconciled records (e.g., records that have been found to agree among the plurality of datasets) along with a confidence score associated with a level of confidence that the reconciliation determination is accurate. The output data may also include metadata indicating the data, criteria, and/or data sources upon which the reconciliation classification and/or confidence score was rendered. The output data generated via method 800 may be stored in a database such that the reconciled (and non-reconciled) data values can be utilized for further data processing, as will be discussed below. In one or more examples, upon classifying the data values at block 806, the system executing the method 800 may automatically trigger a functionality to transmit output data and/or to display output data to a human user.

FIG. 9 shows an example of reconciliation, according to one or more examples of the disclosure. Data values from a first dataset are shown in a first table 901 and data values from a second dataset are shown in a second table 902. The data values can be compared in a pair-wise manner, with a first data value from the first table 901 corresponding to "ID" (1,1) compared to a first data value from the second table 902 corresponding to ID (1,1.1), and so on. The pair of values compared may be identified as related via a record linkage module as described above. The results of the reconciliation are tabulated in the results table 903, which shows that the first data value of the first table 901, 25, is 95% similar to the first data value of the second table 902, 26. In this example, the similarity score is computed according to Eq. 1, with the $\max_{\text{diff}}$ parameter set to 20. Similarly, when comparing the second data value (40) of the first table 901 with the corresponding second data value (31) of the second table 902, the similarity score is 55%. Finally, the similarity of the third data value (75) of the first table 901 as compared to the third data value (40) of the second table 902 is 0%, because the difference between these values exceeds the $\max_{\text{diff}}$ parameter. In this example, the confidence score is based on the cosine similarity between the pair of data values calculated according to Eq. 2, which is 100%, 100%, and 64% for each respective pair of data values, as shown in the results table 903.

Based on the similarity score and/or confidence scores of each data value shown in the results table 903, each data value is given a status of reconciled or not reconciled. In one or more examples, the status may be entirely based on the similarity score, with only data values with a similarity score above a predetermined threshold classified as reconciled. The predetermined threshold may be set by a user, defined by system settings, defined by a third-party input, and/or dynamically determined by the system. In one or more examples, the predetermined threshold requires a similarity score of 90%. The confidence score may impact the status determination, for instance requiring a confidence score of 100%, or a confidence score above a set threshold to classify a particular data value as reconciled.

Figure 10:
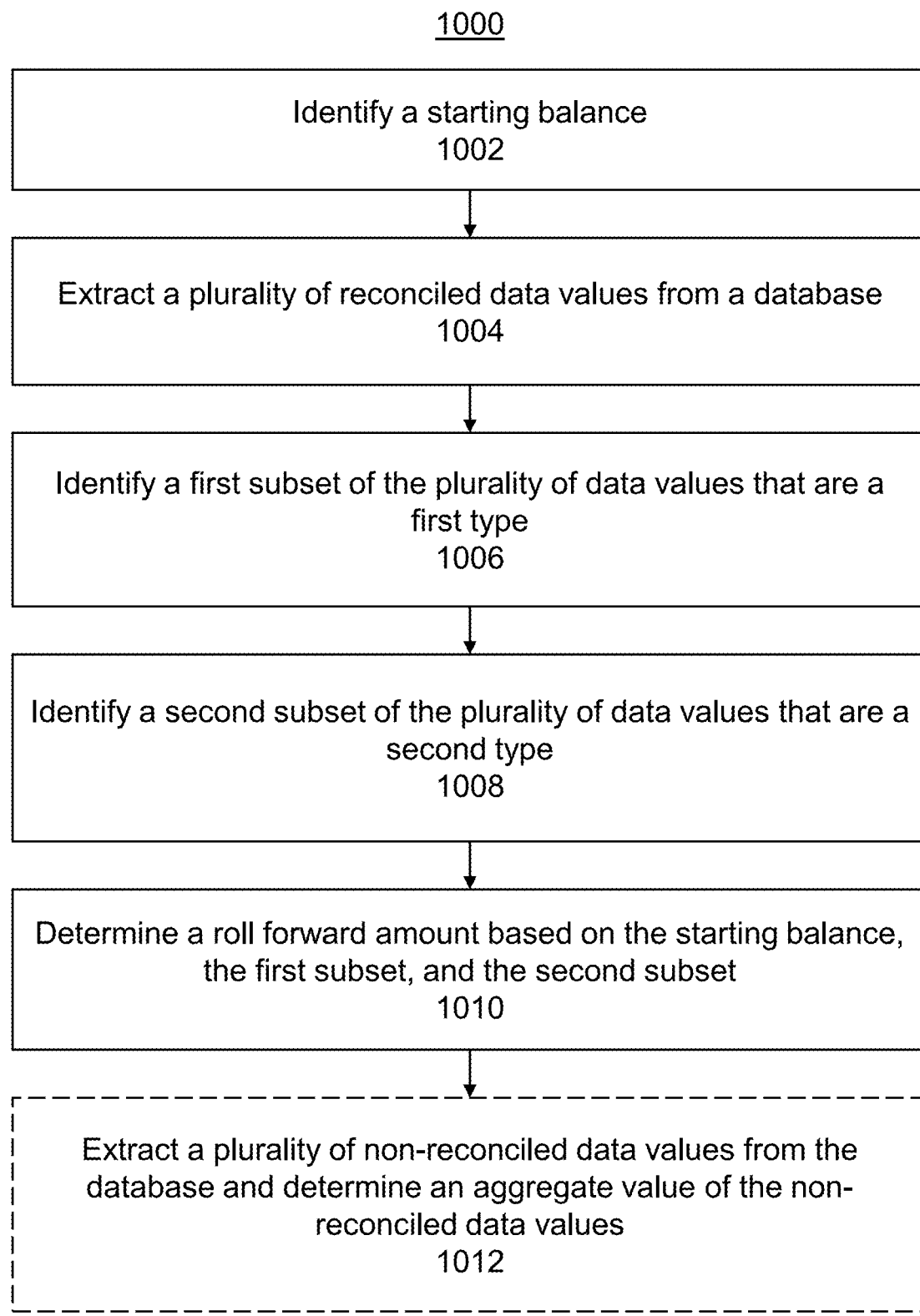
FIG. 10 shows an exemplary method of determining a roll forward amount, according to one or more examples of the disclosure.

As discussed above with respect to method 200 of FIG. 2, the method 200 can include an optional step at block 206 wherein a roll forward amount is determined. FIG. 10 shows an exemplary method 1000 of determining a roll forward amount, according to one or more examples of the disclosure. Method 1000 may be executed when performing block 206 of method 200, and/or may be implemented as a software module of a data processing platform, such as via roll forward module 110 of data processing platform 102 of FIG. 1. The data processing operations performed via method 1000 may be defined by a user, defined by system settings, defined by a third-party input, and/or dynamically determined by the system. Output data generated via method 1000 can be provided to an expert along with intelligent feedback regarding the data processing conducted via each step of the method 1000. For instance, the output data generated via method 1000 may include metadata indicating the data, criteria, and/or data sources subject to data processing. Method 100 may be applicable in a generalized manner to analyze multiple datasets from a multitude of datasets and include the ability to distinguish between particular data values that have been reconciled, and those that have not. Method 1000 may be implemented to determine a variety of roll forward amounts, such as a roll forward relating to accounts receivable, accounts payable, fixed asset, inventory, liability, equity, revenue, expenses, cash, etc.

In one or more examples, method 1000 begins at block 1002 wherein a starting balance is identified. The starting balance is the amount in a ledger from the beginning of the period being analyzed. When identifying the starting balance at block 1002, the method 1000 may apply one or more automated processes to identify the starting balance, which may involve identifying a particular data category corresponding to the starting balance and then extracting the corresponding data value from the data category.

At block 1004 of method 1000, a plurality of reconciled data values are extracted from a database. As described above with respect to method 800, the reconciled data values are data values classified as reconciled based on the similarity score and/or confidence score generated when comparing a value of a first data set against a corresponding related data value of a second dataset (determined to be related according to a record linkage operation), which may be stored in a database that identifies a status (reconciled or not reconciled) and a corresponding confidence score. Thus, extracting reconciled data values in method 1000 can involve extracting data values that were generated via method 800. Each of the data values extracted at block 1004, can include a status (reconciled) as well as a confidence score indicating the confidence level that the status is accurate (e.g., that the particular data value of a first dataset has been found to "agree" with a corresponding data value of a second dataset).

After extracting reconciled data values at block 1004, the method can proceed to block 1006 wherein a first subset of the plurality of data values which are a first type are identified and block 1008 wherein a second subset of the plurality of data values which are a second type are identified. Data values corresponding to the "first type" can correspond to the data values representing additions (the sum of value added) or "credits" to the account over the period being analyzed while the data values that are the "second type" can correspond to the data values representing subtractions or "debits" from the account over the period being analyzed. For instance, when determining an accounts receivable roll forward, the additions can include credit sales that increased the value of the account, and the subtractions can include any write-offs and cash collections that lowered the balance of the account.

Identifying the first subset and second subset of data values from the plurality of extracted reconciled data values can include identifying only data values with a particular confidence score, or data values with a confidence score above a predetermined threshold. For instance, when conducting an audit, a confidence level of 90% is generally associated with "reasonable assurance" that may be necessary for certain compliance purposes. Accordingly, when identifying the first subset and second subset of data values, only those with a confidence level above a confidence threshold of 90% may be selected. The confidence threshold may be determined by a user. The confidence threshold may instead by dynamically determined by the system. For example, the confidence threshold may be based on a percentage of the total value of the first subset and/or second subset, or of the starting balance identified at block 1002. For instance, if the aggregate value of the first subset is $500,000 and the starting balance is $1,000,000, the system may determine that a potential misstatement in the value of the first subset would have a material impact on the total because the first subset $50,000 is currently valued at 50% of the starting balance. Thus, the confidence threshold may be set to a high value, such as 95%. Alternatively, if the aggregate value of the first subset is instead $50,000, the confidence threshold may be set to a much lower value, such as 50% because the first subset is only 0.05% of the starting balance.

After identifying the data values that are a first and second type at blocks 1006 and 1008, the method 1000 can move to block 1010 wherein the roll forward amount is determined based on the starting balance, the first subset of data values and the second subset of data values. Generally, a roll forward amount can be determined by adding the aggregate value of the data values of the first type and the aggregate value of the data values of the second type (likely a negative number) to the starting balance.

In one or more examples, the roll forward amount may be determined based on one pair of datasets, one credit dataset and one debit dataset. The roll forward amount may instead be referred to as "composable" in that any number of credit datasets and any number of debit datasets may be analyzed via the method 1000 without requiring data processing that is specifically formulated for the datasets being analyzed. For instance, the roll forward amount may be based on a pair of credit datasets and a pair of debit datasets, possibly that were received from different data sources.

The roll forward amount may comprise a plurality of sub-amounts, with each sub-amount having a confidence score based on the confidence score of the data values that are included in the sub-amount. For example, a roll forward amount may have a first sub-amount with a confidence score of 100% that is based on data values from the first and second subsets that have a confidence score of 100%, and a second sub-amount with a confidence score of 90% that is based on data values from the first and second subsets that have a confidence score of 90%. In one or more examples, upon determining the roll forward amount at block 1010, the system executing the method 1000 may automatically trigger a functionality to transmit output data and/or to display output data to a human user.

In one or more examples, method 1000 may include block 1012, wherein a plurality of non-reconciled data values are extracted from the database and an aggregate value of the non-reconciled data values is determined. As described above, the non-reconciled data values are data values classified as not reconciled based on the similarity score and/or confidence score generated when comparing a value of a first data set against a corresponding related data value of a second dataset (determined to be related according to a record linkage operation). The aggregate value can be determined by computing the sum of each of the non-reconciled data values (both credit and debit values). The aggregate value may then be reported, such as by transmitting output data and/or displaying data to a human user.

In one or more examples, the system may determine a ratio between the aggregate value of the non-reconciled data values and the value of the roll forward amount (including any sub-amounts). If the ratio is below a predetermined threshold, indicating that a large portion of the datasets include non-reconciled data values, then the system executing method 1000 may trigger one or more functionalities.

For instance, the system may automatically retrieve new data values (e.g., one or more new datasets) from the same data source and/or a new data source if the ratio is below the predetermined threshold. The system may automatically transmit an alert to a user (such as by transmitting output data and/or displaying data) that solicits manual review. The predetermined threshold may be based on the total number of data values being considered. For instance, the predetermined threshold may stipulate that 98% of all data values (credit and debit) must be included in the roll forward amount (e.g., 98% of the data values must be reconciled).

Figure 11:
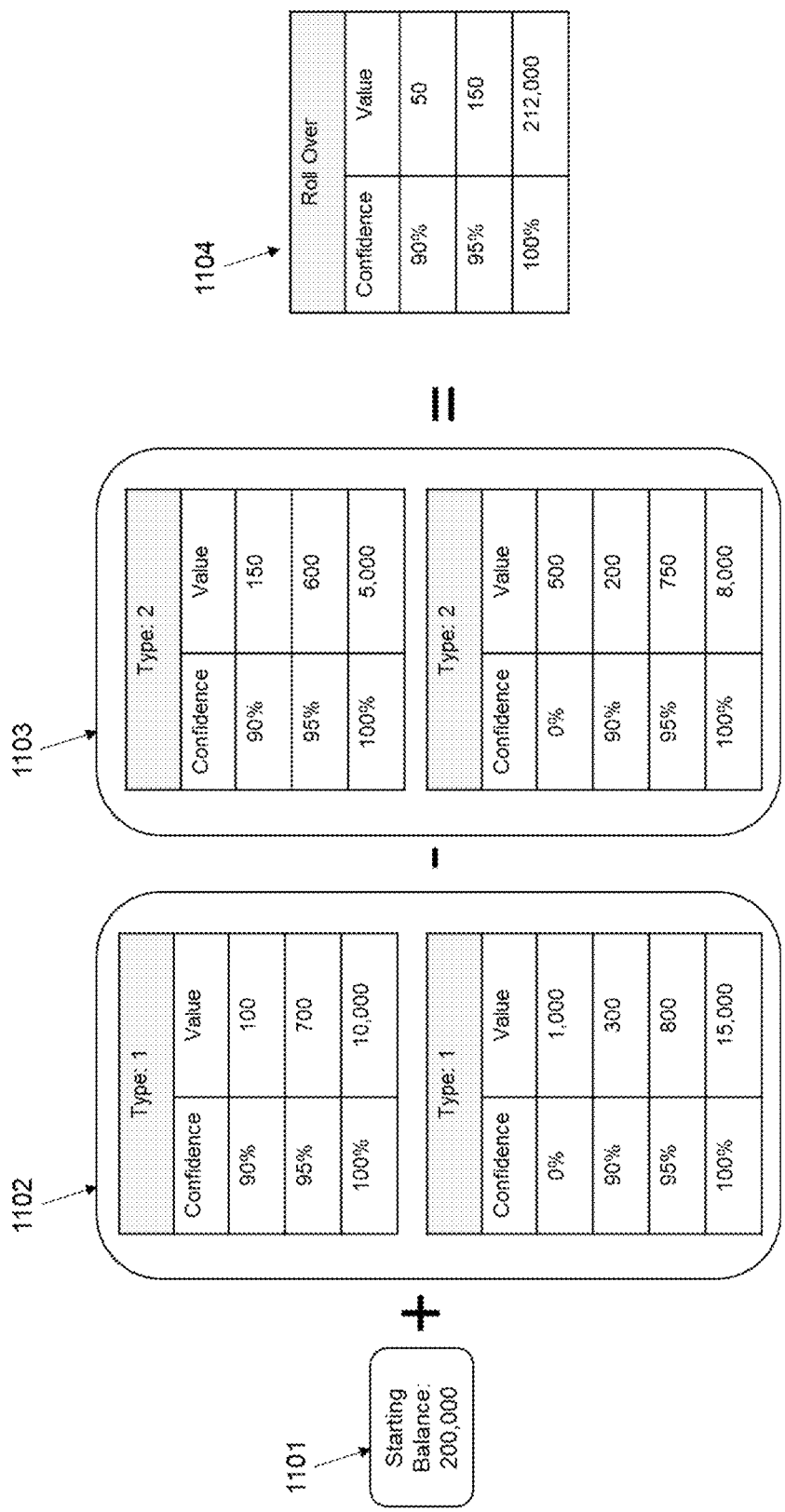
FIG. 11 shows an example of a roll forward computation, according to one or more examples of the disclosure.

FIG. 11 shows an example of a roll forward computation, according to one or more examples of the disclosure. The starting balance is shown in block 1101, which is 200,000. The credit data values are shown in box 1102, which includes a pair of credit datasets (classified as "Type 1"), that contain data values and corresponding confidence scores. The debit data values are shown in box 1103, which includes a pair of debit datasets (classified as "Type 2"), that also contain data values and corresponding confidence scores. The results of the roll forward determination are shown in the results table 1104, which includes three separate roll forward amounts each with a corresponding confidence score. In this example, the data values with a confidence score of 100% are as follows: starting balance of 200,000, credits of 25,000, and debits of 13,000. Thus, adding the credit amount of 25,000 to and subtracting the debit amount of 13,000 from the starting balance of 2000,000 results with a roll forward amount of 212,000. Following a similar process for the confidence scores of 95% and 90% results with roll forward amount of 150 with a confidence score of 95% and a roll forward amount of 50 with a confidence score of 90%. Notably, however, there are remaining credit and debit values that together amount to 1,500, which are not included in any of the roll forward amounts in the results table 1104 because they each have a confidence score of 0%. When reporting the results of this example, this amount may be reported separately as data values that did not fully tie out (e.g., were not reconciled).

Figure 12:
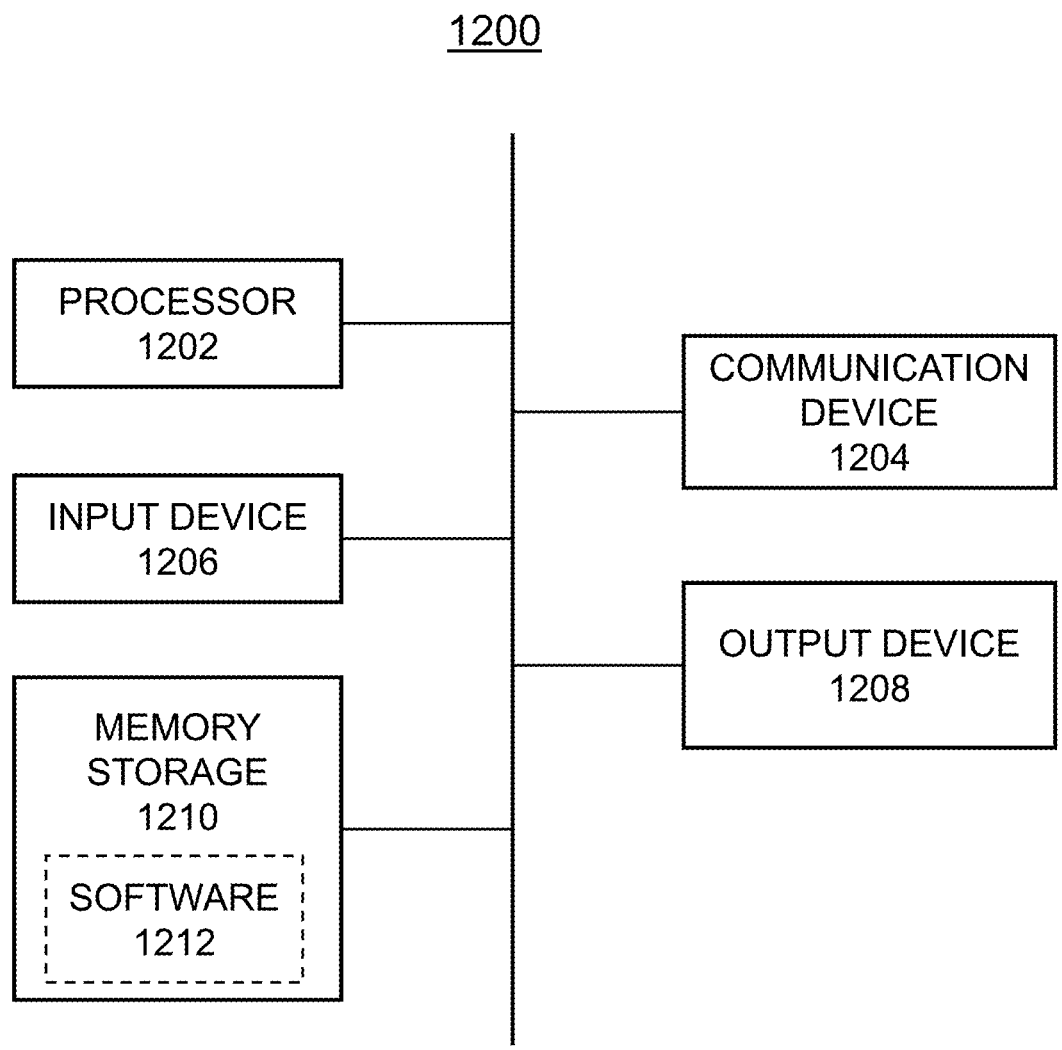
FIG. 12 shows an exemplary computing device, according to one or more examples of the disclosure.

FIG. 12 shows an exemplary computing device 1200, according to one or more examples of the disclosure. Device 1200 can be a component of a data processing platform, such as data processing platform 102 of FIG. 1. In one or more examples, device 1200 can be configured to execute a method performing aspects of data processing operation, such as method 200 of FIG. 2. Device 1200 may be configured to execute a method for generating a data profile for a dataset, such as method 400 of FIG. 4. Device 1200 may be configured to execute a method for identifying related data values in a plurality of datasets, such as method 500 of FIG. 5. Device 1200 may be configured to execute a method for reconciling data values, such as method 800 of FIG. 8. Device 1200 may be configured to execute a method for determining a roll forward amount, such as method 1000 of FIG. 10.

Device 1200 can be a host computer connected to a network. Device 1200 can be a client computer or a server. As shown in FIG. 12 device 1200 can be any suitable type of microprocessor-based device, such as a personal computer, workstation, server, or handheld computing device (portable electronic device) such as a phone or tablet. The device can include, for example, one or more of processors 1202, input device 1206, output device 1208, storage 1210, and communication device 1204. Input device 1206 and output device 1208 can generally correspond to those described above and can either be connectable or integrated with the computer.

Input device 1206 can be any suitable device that provides input, such as a touch screen, keyboard or keypad, mouse, or voice-recognition device. Output device 1208 can be any suitable device that provides output, such as a touch screen, haptics device, or speaker.

Storage 1210 can be any suitable device that provides storage, such as an electrical, magnetic, or optical memory, including a RAM, cache, hard drive, or removable storage disk. Communication device 1204 can include any suitable device capable of transmitting and receiving signals over a network, such as a network interface chip or device. The components of the computer can be connected in any suitable manner, such as via a physical bus or wirelessly.

Software 1212, which can be stored in storage 1210 and executed by processor 1202, can include, for example, the programming that embodies the functionality of the present disclosure (e.g., as embodied in the devices as described above).

Software 1212 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1210, that can contain or store programming for use by or in connection with an instruction execution system, apparatus, or device.

Software 1212 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Device 1200 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 1200 can implement any operating system suitable for operating on the network. Software 1212 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

Although particular examples relating to auditing processes have been described above, the methods, devices, and systems described herein are applicable to other applications as well. For instance, the data processing operations described with respect to method 200 of FIG. 2, method 400 of FIG. 4, method 500 of FIG. 5, and/or method 800 of FIG. 8 may be implemented to identify related data values between a plurality of datasets containing patient medical records to perform medical record linkage or to combine datasets when generating a data warehouse. The methods and processes described herein may be used to merge datasets and/or to validate data processing operations, for example for use in generating datasets usable for performing a variety of data analytics operations and/or training ML algorithms. Accordingly, the methods, devices, and systems described herein are not inherently related to any particular application.

The preceding description sets forth exemplary methods, parameters and the like. It should be recognized, however, that such description is not intended as a limitation on the scope of the present disclosure but is instead provided as a description of exemplary embodiments. The illustrative embodiments described above are not meant to be exhaustive or to limit the disclosure to the precise forms disclosed. Many modifications and variations are possible in view of the above teachings. The embodiments were chosen and described to best explain the principles of the disclosed techniques and their practical applications. Others skilled in the art are thereby enabled to best utilize the techniques, and various embodiments with various modifications as are suited to the particular use contemplated.

Although the preceding description uses terms first, second, etc. to describe various elements, these elements should not be limited by the terms. These terms are only used to distinguish one element from another. Also, it is also to be understood that the singular forms "a," "an," and "the" used in the preceding description are intended to include the plural forms as well unless the context indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

In some embodiments, a non-transitory computer-readable storage medium stores one or more programs configured to be executed by one or more processors of an electronic device, the one or more programs including instructions for implementing any of the steps described or claimed herein. The present disclosure also relates to a device for performing the operations herein. This device may be specially constructed for the required purposes, or it may include a general-purpose computer selectively activated or reconfigured by a computer program stored in the computer. Such a computer program may be stored in a non-transitory, computer computer-readable storage medium, such as, but not limited to, any type of disk, including floppy disks, optical disks, CD-ROMs, magnetic-optical disks, read-only memories (ROMs), random access memories (RAMs), electrically program read-only memories (EPROMs), electronically erasable program read-only memories EEPROMs, magnetic or optical cards, application specific integrated circuits (ASICs), or any type of media suitable for storing electronic instructions, and each coupled to a computer system bus. Furthermore, the computers referenced in this disclosure may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems appears from the description above. Also, the present disclosure is not described with reference to any particular programming language. It will be appreciated that a variety of programming languages may be used to implement the teachings of the present disclosure as described herein.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

Following is a list of enumerated embodiments:

Embodiment 1. A method for identifying a plurality of related data values in a plurality of datasets, wherein the method is performed by a system comprising one or more processors, the method comprising:
  extracting a plurality of data categories and corresponding data values from a dataset of the plurality of datasets;
  identifying one or more potential linking categories from the plurality of extracted data categories;
  determining a validity of the one or more potential linking categories based on the corresponding data values of the one or more potential linking categories;
  selecting one or more linking categories from the potential linking categories based on the validity of the selected one or more linking categories; and
  identifying related data values between the plurality of datasets based on the selected one or more linking categories.

Embodiment 2. The method of embodiment 1, wherein identifying the one or more potential linking categories comprises:
  generating a data profile for a respective dataset of the plurality of datasets comprising the respective potential linking category; and
  generating a uniqueness hypothesis for each of the respective potential linking categories based on the data profile of the respective dataset.

Embodiment 3. The method of embodiment 2, wherein determining the validity of the one or more potential linking categories is based on the data profile of the respective dataset and historical data from past sessions of identifying related data values within other datasets.

Embodiment 4. The method of embodiment 2, wherein generating the data profile comprises:
  determining a data structure of the respective dataset based on the corresponding data values of the respective dataset;
  determining a content of each category of the one or more categories of the respective dataset based on the corresponding data values of the respective category; and identifying one or more relationships between the one or more data categories of the respective dataset based on the data structure and/or the content of the one or more data categories of the respective dataset.

Embodiment 5. The method of embodiment 4, wherein determining the content of each category of the one or more categories comprises, for a category of the one or more data categories:
generating statistics about the corresponding data values of the category;
identifying one or more errors in the corresponding data values of the category; and
identifying one or more empty data cells having missing corresponding data values.

Embodiment 6. The method of embodiment 5, wherein generating statistics comprises determining a sum of the corresponding data values of the category, identifying a minimum and a maximum data value, determining an average data value, and/or determining a length of each data value of the corresponding data values of the category.

Embodiment 7. The method of embodiment 4, wherein determining the content of each category of the one or more categories comprises identifying a taxonomy of each category.

Embodiment 8. The method of embodiment 1, wherein identifying the plurality of related data values comprises applying a rule-based approach and/or a machine learning (ML)-based approach.

Embodiment 9. The method of embodiment 1, wherein each of the plurality of related data values of a first dataset has one corresponding data value in a second dataset.

Embodiment 10. The method of embodiment 1, wherein one or more of the plurality of related data values of a first dataset has more than one corresponding data value in a second dataset.

Embodiment 11. The method of embodiment 1, wherein a plurality of the related data values of a first dataset correspond to a plurality of the corresponding data values of a second dataset Embodiment 12. The method of embodiment 1, wherein a plurality of the related data values of a first dataset correspond to one corresponding data value in a second dataset.

Embodiment 13. The method of embodiment 1, wherein the plurality of datasets store data in one of a table, a report, a spreadsheet, a document, and a collection of documents.

Embodiment 14. The method of embodiment 1, wherein the plurality of datasets store data according to a self-describing data format.

Embodiment 15. The method of embodiment 1, wherein the plurality of datasets do not share a common identifier.

Embodiment 16. The method of embodiment 1, comprising:
determining, for each of the plurality of related data values of a first dataset of the plurality of datasets:
a similarity score that indicates a degree of similarity between a respective data value of the plurality of related data values of the first dataset and a corresponding related data value of a second dataset comprising a plurality of corresponding related data values;
a confidence score that indicates a confidence level as to whether the similarity score is accurate; and
classifying the plurality of related data values of the first dataset as reconciled or non-reconciled based on the similarity score.

Embodiment 17. The method of embodiment 16, wherein the plurality of related data values classified as reconciled have a similarity score above a first predetermined threshold and a confidence score above a second predetermined threshold.

Embodiment 18. The method of embodiment 16, wherein determining the similarity score comprises assigning a similarity score of zero if the respective data value of the plurality of related data values of the first dataset differs from the corresponding related data value of the second dataset by more than a predetermined amount.

Embodiment 19. The method of embodiment 16, wherein determining the similarity score is based in part on a distance between the respective data value of the plurality of data values of the first dataset and the corresponding data value of the second dataset.

Embodiment 20. The method of embodiment 16, wherein determining the confidence score comprises determining a cosine similarity between each of the plurality of data values of the first dataset and the corresponding related data values of the second dataset.

Embodiment 21. A system for identifying a plurality of related data values in a plurality of datasets, the system comprising one or more processors configured to cause the system to:
extract a plurality of data categories and corresponding data values from a dataset of the plurality of datasets;
identify one or more data categories from the plurality of extracted data categories as one or more potential linking categories;
determine a validity of the one or more potential linking categories based on the corresponding data values of the one or more potential linking categories;
select one or more linking categories of the potential linking categories based on the validity of the selected one or more linking categories; and
identify related data values between the plurality of datasets based on the selected one or more linking categories.

Embodiment 22. A non-transitory computer-readable storage medium storing instructions for identifying a plurality of related data values in a plurality of datasets, the instructions configured to be executed by a system comprising one or more processors to cause the system to:
extract a plurality of data categories and corresponding data values from a dataset of the plurality of datasets;
identify one or more data categories from the plurality of extracted data categories as one or more potential linking categories;
determine a validity of the one or more potential linking categories based on the corresponding data values of the one or more potential linking categories;
select one or more linking categories of the potential linking categories based on the validity of the selected one or more linking categories; and
identify related data values between the plurality of datasets based on the selected one or more linking categories.

Embodiment 23. A method for classifying data values as reconciled or non-reconciled, wherein the method is performed by a system comprising one or more processors, the method comprising:
   identifying a plurality of related data values in a plurality of datasets;
   determining, for each of the plurality of related data values of a first dataset of the plurality of datasets:
      a similarity score that indicates a degree of similarity between a respective data value of the plurality of related data values of the first dataset and a corresponding related data value of a second dataset comprising a plurality of corresponding related data values;
      a confidence score that indicates a confidence level as to whether the similarity score is accurate; and
      classifying the plurality of related data values of the first dataset as reconciled or non-reconciled based on the similarity score and/or the confidence score.

Embodiment 24. The method of embodiment 23, wherein the plurality of related data values classified as reconciled have a similarity score above a first predetermined threshold and a confidence score above a second predetermined threshold.

Embodiment 25. The method of embodiment 23, wherein determining the similarity score comprises assigning a similarity score of zero if the respective data value of the plurality of related data values of the first dataset differs from the corresponding related data value of the second dataset by more than a predetermined amount.

Embodiment 26. The method of embodiment 23, wherein determining the similarity score is based in part on a distance between the respective data value of the plurality of data values of the first dataset and the corresponding data value of the second dataset.

Embodiment 27. The method of embodiment 23, wherein determining the confidence score comprises determining a cosine similarity between each of the plurality of data values of the first dataset and the corresponding related data values of the second dataset.

Embodiment 28. The method of embodiment 23, wherein identifying the plurality of related data values comprises:
   extracting a plurality of data categories and corresponding data values from a dataset of the plurality of datasets;
   identifying one or more potential linking categories from the plurality of extracted data categories;
   determining a validity of the one or more potential linking categories based on the corresponding data values of the one or more potential linking categories;
   selecting one or more linking categories from the potential linking categories based on the validity of the selected one or more linking categories; and
   identifying related data values between the plurality of datasets based on the selected one or more linking categories.

Embodiment 29. The method of embodiment 28, wherein identifying the one or more potential linking categories comprises:
   generating a data profile for a respective dataset of the plurality of datasets comprising the respective potential linking category; and
   generating a uniqueness hypothesis for each of the respective potential linking categories based on the data profile of the respective dataset.

Embodiment 30. The method of embodiment 29, wherein determining the validity of the one or more potential linking categories is based on the data profile of the respective dataset and historical data from past sessions of identifying related data values within other datasets.

Embodiment 31. The method of embodiment 29, wherein generating the data profile comprises:
   determining a data structure of the respective dataset based on the corresponding data values of the respective dataset;
   determining a content of each category of the one or more categories of the respective dataset based on the corresponding data values of the respective category; and
   identifying one or more relationships between the one or more data categories of the respective dataset based on the data structure and/or the content of the one or more data categories of the respective dataset.

Embodiment 32. The method of embodiment 31, wherein determining the content of each category of the one or more categories comprises, for a category of the one or more data categories:
   generating statistics about the corresponding data values of the category;
   identifying one or more errors in the corresponding data values of the category; and
   identifying one or more empty data cells having missing corresponding data values.

Embodiment 33. The method of embodiment 32, wherein generating statistics comprises determining a sum of the corresponding data values of the category, identifying a minimum and a maximum data value, determining an average data value, and/or determining a length of each data value of the corresponding data values of the category.

Embodiment 34. The method of embodiment 31, wherein determining the content of each category of the one or more categories comprises identifying a taxonomy of each category.

Embodiment 35. The method of embodiment 23, wherein identifying the plurality of related data values comprises applying a rule-based approach and/or a machine learning (ML)-based approach.

Embodiment 36. The method of embodiment 23, wherein each of the plurality of related data values of the first dataset has one corresponding data value in the second dataset.

Embodiment 37. The method of embodiment 23, wherein one or more of the plurality of related data values of the first dataset has more than one corresponding data value in the second dataset.

Embodiment 38. The method of embodiment 23, wherein a plurality of the related data values of the first dataset correspond to a plurality of the corresponding data values of the second dataset.

Embodiment 39. The method of embodiment 23, wherein a plurality of the related data values of the first dataset correspond to one corresponding data value in the second dataset.

Embodiment 40. The method of embodiment 23, wherein the plurality of datasets store data in one of a table, a report, a spreadsheet, a document, and a collection of documents.

Embodiment 41. The method of embodiment 23, wherein the plurality of datasets store data according to a self-describing data format.

Embodiment 42. The method of embodiment 23, wherein the plurality of datasets do not share a common identifier.

Embodiment 43. A system for classifying data values as reconciled or non-reconciled, the system comprising one or more processors configured to cause the system to:
- identify a plurality of related data values in a plurality of datasets;
- determine, for each of the plurality of related data values of a first dataset of the plurality of datasets:
  - a similarity score that indicates a degree of similarity between a respective data value of the plurality of related data values of the first dataset and a corresponding related data value of a second dataset comprising a plurality of corresponding related data values;
  - a confidence score that indicates a confidence level as to whether the similarity score is accurate; and
- classify the plurality of related data values of the first dataset as reconciled or non-reconciled based on the similarity score.

Embodiment 44. A non-transitory computer-readable storage medium storing instructions for classifying data values as reconciled or non-reconciled, the instructions configured to be executed by a system comprising one or more processors to cause the system to:
- identify a plurality of related data values in a plurality of datasets;
- determine, for each of the plurality of related data values of a first dataset of the plurality of datasets:
  - a similarity score that indicates a degree of similarity between a respective data value of the plurality of related data values of the first dataset and a corresponding related data value of a second dataset comprising a plurality of corresponding related data values;
  - a confidence score that indicates a confidence level as to whether the similarity score is accurate; and
- classify the plurality of related data values of the first dataset as reconciled or non-reconciled based on the similarity score.

The invention claimed is:

1. A method for identifying a plurality of related data values in a plurality of datasets, wherein the method is performed by a system comprising one or more processors, the method comprising:
   - extracting a plurality of data categories and corresponding data values from a dataset of the plurality of datasets;
   - identifying one or more potential linking categories from the plurality of extracted data categories;
   - determining a validity of the one or more potential linking categories based on the corresponding data values of the one or more potential linking categories;
   - selecting one or more linking categories from the potential linking categories based on the validity of the selected one or more linking categories; and
   - identifying related data values between the plurality of datasets based on the selected one or more linking categories.

2. The method of claim 1, wherein identifying the one or more potential linking categories comprises:
   - generating a data profile for a respective dataset of the plurality of datasets comprising the respective potential linking category; and
   - generating a uniqueness hypothesis for each of the respective potential linking categories based on the data profile of the respective dataset.

3. The method of claim 2, wherein determining the validity of the one or more potential linking categories is based on the data profile of the respective dataset and historical data from past sessions of identifying related data values within other datasets.

4. The method of claim 2, wherein generating the data profile comprises:
   - determining a data structure of the respective dataset based on the corresponding data values of the respective dataset;
   - determining a content of each category of the one or more categories of the respective dataset based on the corresponding data values of the respective category; and
   - identifying one or more relationships between the one or more data categories of the respective dataset based on the data structure and/or the content of the one or more data categories of the respective dataset.

5. The method of claim 4, wherein determining the content of each category of the one or more categories comprises, for a category of the one or more data categories:
   - generating statistics about the corresponding data values of the category;
   - identifying one or more errors in the corresponding data values of the category; and
   - identifying one or more empty data cells having missing corresponding data values.

6. The method of claim 5, wherein generating statistics comprises determining a sum of the corresponding data values of the category, identifying a minimum and a maximum data value, determining an average data value, and/or determining a length of each data value of the corresponding data values of the category.

7. The method of claim 4, wherein determining the content of each category of the one or more categories comprises identifying a taxonomy of each category.

8. The method of claim 1, wherein identifying the plurality of related data values comprises applying a rule-based approach and/or a machine learning (ML)-based approach.

9. The method of claim 1, wherein each of the plurality of related data values of a first dataset has one corresponding data value in a second dataset.

10. The method of claim 1, wherein one or more of the plurality of related data values of a first dataset has more than one corresponding data value in a second dataset.

11. The method of claim 1, wherein a plurality of the related data values of a first dataset correspond to a plurality of the corresponding data values of a second dataset.

12. The method of claim 1, wherein a plurality of the related data values of a first dataset correspond to one corresponding data value in a second dataset.

13. The method of claim 1, wherein the plurality of datasets store data in one of a table, a report, a spreadsheet, a document, and a collection of documents.

14. The method of claim 1, wherein the plurality of datasets store data according to a self-describing data format.

15. The method of claim 1, wherein the plurality of datasets do not share a common identifier.

16. The method of claim 1, comprising:
   - determining, for each of the plurality of related data values of a first dataset of the plurality of datasets:
     - a similarity score that indicates a degree of similarity between a respective data value of the plurality of related data values of the first dataset and a corresponding related data value of a second dataset comprising a plurality of corresponding related data values;
     - a confidence score that indicates a confidence level as to whether the similarity score is accurate; and classifying the plurality of related data values of the first dataset as reconciled or non-reconciled based on the similarity score.

17. The method of claim 16, wherein the plurality of related data values classified as reconciled have a similarity score above a first predetermined threshold and a confidence score above a second predetermined threshold.

18. The method of claim 16, wherein determining the similarity score comprises assigning a similarity score of zero if the respective data value of the plurality of related data values of the first dataset differs from the corresponding related data value of the second dataset by more than a predetermined amount.

19. The method of claim 16, wherein determining the similarity score is based in part on a distance between the respective data value of the plurality of data values of the first dataset and the corresponding data value of the second dataset.

20. The method of claim 16, wherein determining the confidence score comprises determining a cosine similarity between each of the plurality of data values of the first dataset and the corresponding related data values of the second dataset.

21. A system for identifying a plurality of related data values in a plurality of datasets, the system comprising one or more processors configured to cause the system to:
   extract a plurality of data categories and corresponding data values from a dataset of the plurality of datasets;
   identify one or more data categories from the plurality of extracted data categories as one or more potential linking categories;
   determine a validity of the one or more potential linking categories based on the corresponding data values of the one or more potential linking categories;
   select one or more linking categories of the potential linking categories based on the validity of the selected one or more linking categories; and
   identify related data values between the plurality of datasets based on the selected one or more linking categories.

22. A non-transitory computer-readable storage medium storing instructions for identifying a plurality of related data values in a plurality of datasets, the instructions configured to be executed by a system comprising one or more processors to cause the system to:
   extract a plurality of data categories and corresponding data values from a dataset of the plurality of datasets;
   identify one or more data categories from the plurality of extracted data categories as one or more potential linking categories;
   determine a validity of the one or more potential linking categories based on the corresponding data values of the one or more potential linking categories;
   select one or more linking categories of the potential linking categories based on the validity of the selected one or more linking categories; and
   identify related data values between the plurality of datasets based on the selected one or more linking categories.

* * * * *